United States Patent
Maeda et al.

(10) Patent No.: US 6,310,156 B1
(45) Date of Patent: *Oct. 30, 2001

(54) (METH) ACRYLIC ACID POLYMER AND MANUFACTURING METHOD THEREOF

(75) Inventors: Yoshihiro Maeda, Ibaraki; Tamao Ishida, Osaka; Shigeru Yamaguchi, Yao, all of (JP)

(73) Assignee: Nippon Shokubai Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/262,011

(22) Filed: Mar. 4, 1999

(30) Foreign Application Priority Data

Mar. 6, 1998 (JP) ................................................ 10-055490
Aug. 3, 1998 (JP) ................................................ 10-219326
Aug. 10, 1998 (JP) ................................................ 10-226006

(51) Int. Cl.$^7$ ..................................................... C08F 2/00
(52) U.S. Cl. ............................................................. 526/234
(58) Field of Search ................................................ 526/234

(56) References Cited

U.S. PATENT DOCUMENTS 3,646,099   2/1972   Dannala .

FOREIGN PATENT DOCUMENTS

| 2 590 261 | 5/1987 | (DE) . |
|---|---|---|
| 0 668 298 A1 | 8/1995 | (EP) . |
| 58-67706 | 4/1983 | (JP) . |
| 60-24806 | 6/1985 | (JP) . |
| 63-235313 | 9/1988 | (JP) . |
| 64-38403 | 2/1989 | (JP) . |
| 5-86125 | 4/1993 | (JP) . |

OTHER PUBLICATIONS

PCT Patent Abstract, PCT Patent Publication No. WO 95/03342, Feb. 1995.

*Primary Examiner*—Necholus Ogden
(74) *Attorney, Agent, or Firm*—Staas & Halsey LLP

(57) ABSTRACT

A (meth)acrylic acid polymer is obtained by conducting a polymerization reaction using 60 mol % or more of a hydrophilic monomer containing (meth)acrylic acid and a combination of at least one kind of persulfate salts and at least one kind of bisulfite salts as an initiator series under conditions that a pH is smaller than 5 and a degree of neutralization is smaller than 40 mol %, in such a manner that a solid concentration when the polymerization reaction ends is 40% or higher. The resulting polymer has a weight average molecular weight ranging from 3,000 to 15,000, a sulfonic acid group at an end terminal, and an anti-gelling ability Q-value smaller than 2.0, where the anti-gelling ability Q-value is defined as:

$$Q = \frac{\text{degree of gelling} \times 10^5}{\text{weight average molecular weight}}.$$

Consequently, it has become possible to provide a low-molecular-weight (meth)acrylic acid polymer having not only excellent dispersing ability and chleating ability, but also high resistance to gelling, and an efficient manufacturing method of such a polymer.

16 Claims, No Drawings

(METH) ACRYLIC ACID POLYMER AND MANUFACTURING METHOD THEREOF

FIELD OF THE INVENTION

The present invention relates to a (meth)acrylic acid polymer suitably used as a water-based dispersant, a scaling inhibitor, a detergent builder, etc., and a manufacturing method thereof. The present invention also relates to an (acrylic acid/acrylate–maleic acid/maleate) copolymer and a manufacturing method thereof, and to a detergent composition.

BACKGROUND OF THE INVENTION

Conventionally, of water-soluble polymers including polyacrylic acid, polymaleic acid, etc., those having a low molecular weight have been suitably used as a dispersant for an inorganic pigment or metal ions, a scaling inhibitor, a detergent builder, etc. Known methods of obtaining such a water-soluble polymer having a low molecular weight are disclosed in, for example, ① Japanese Laid-open Patent Application No. 38403/1989 (Japanese Official Gazette, Tokukaisho No. 64-38403, published on Feb. 8, 1989), and (Japanese Laid-open Patent Application No. 86125/1993 (Japanese Official Gazette, Tokukaihei No. 5-86125, published on Apr. 6, 1993).

According to the method disclosed in Gazette ①, when one or more than one kind of a water-soluble vinyl monomer (ethylenic monomer) is radical polymerized using a water-soluble azo radical polymerization initiator, sulfurous ions are provided in a range between 0.1 and 30 mol % based on a total weight of the monomer. The monomer used in this method is not especially limited as long as it is a water-soluble vinyl monomer, and by adopting this method, a water-soluble polymer having a molecular weight as low as ten to a hundred thousand molecular weight can be obtained at satisfactory reproductivity.

According to the method disclosed in Gazette ②, by subjecting acrylic acid or acrylate to aqueous solution polymerization while maintaining a pH of the reaction series in a range between 6 and 9 (under neutralized condition), a water-soluble polymer having 95 mol % or more of acrylic acid or acrylate can be obtained. An average molecular weight of the resulting polymer is in a range between 300 and 10,000, and a degree of dispersion is in a range between 1.3 and 2.3. Since the water-soluble polymer obtained by this method has a low molecular weight and a small variance in degree of dispersion (narrow molecular weight distribution), it exhibits a good dispersing ability, and therefore, can be suitably used as dispersants of various kinds, a detergent builder, etc.

Further, ③ Japanese Laid-open Patent Application No. 55407/1981 (Japanese Official Gazette, Tokukaisho No. 56-55407, published on May 16, 1981, or Tokukousho No. 60-24806) discloses a manufacturing method of a low-molecular-weight acrylate polymer. According to the method disclosed in Gazette ③, (A) alkali metal salt acrylate, (B) acrylamide or 2-hydroxyethyl (meth)acrylate, and (C) a hydrophilic monomer copolymerizible with the components (A) and (B) are subjected to aqueous solution polymerization at a specific ratio under the conditions: 10 l or more of air for 1 mole of the component (A), and a polymerization temperature at or below 80° C.

The water-soluble acrylate polymer obtained by this method has a molecular weight ranging from 500 to 100,000 and a narrow molecular weight distribution. Also, this polymer is free of impurities and hardly colored. Moreover, 0.5–1.5 sulfonic acid group per molecule is introduced to an end terminal of a straight chain or a side chain of the water-soluble polymer. Hence, the water-soluble polymer has excellent dispersing ability and chelating ability, and therefore, can be suitably used as an inorganic pigment dispersant, a detergent builder, a detergent agent, or a scaling inhibitor.

Although it is not directed to the above water-soluble polymer, ④ U.S. Pat. No. 3,646,099 (US Official Gazette, published on Feb. 29, 1972) discloses a technique of manufacturing a low-molecular-weight polymer. A low-molecular-weight polymer disclosed in Gazette ④ is used for a conductive paint, which is obtained by polymerizing (meth)acrylonitrile with a hydrophobic monomer. Note that, however, 40 mol % or more of the hydrophobic monomer based on a total weight of the resulting polymer has to be included in raw materials. By adopting this method, a polymer having a molecular weight of 25,000 or smaller can be manufactured.

However, there remains a problem that none of the aforementioned methods can manufacture, in a sufficiently efficient manner, a low-molecular-weight water-soluble polymer having not only excellent dispersing ability and chelating ability, but also high resistance to gelling.

More specifically, with the technique disclosed in Gazette ① or ②, it is very difficult to introduce a sulfonic acid group quantitatively to an end terminal or a side chain of the polymer. Thus, the resulting water-soluble polymer can not attain excellent dispersing ability or chelating ability, and therefore, can not be used optimally as a dispersant, a detergent builder, a detergent agent, or a scaling inhibitor.

On the other hand, with the technique disclosed in Gazette ③, sulfonic acid groups can be introduced to the resulting water-soluble polymer to some extent. However, since acrylate (alkali metal salt) is used as the monomer in this technique, a polymerization reaction series is almost completely neutralized.

If polymerization takes place in such a neutralized state using acrylate, when a solid concentration of the reaction series is increased, a viscosity of an aqueous solution of the reaction series increases sharply as the polymerization proceeds, and accordingly, a molecular weight of the resulting polymer tends to increase markedly. For this reason, with the technique disclosed in Gazette ③, a low-molecular-weight polymer can not be manufactured by polymerizing a monomer under a high-concentration condition, thereby posing a problem that a manufacturing efficiency is reduced.

Further, with the technique disclosed in Gazette ④, a low-molecular-weight polymer can be manufactured in a satisfactory manner, but since 40 mol % or more of a hydrophobic monomer has to be used, the resulting low-molecular-weight polymer is insoluble to water. In other words, the technique disclosed in Gazette ④ is directed to a technique of manufacturing a low-molecular-weight polymer for a conductive paint, and merely using a water-soluble monomer can not yield a water-soluble polymer in a satisfactory manner.

Also, in order to be used suitably as a dispersant, a scaling inhibitor, a detergent builder, etc., it is preferable that the low-molecular-weight water-soluble polymer has not only excellent dispersing ability and chelating ability, but also high resistance to gelling, namely properties not turning into gel. However, a water-soluble polymer having high resistance to gelling can not be obtained with any of the techniques disclosed in aforementioned Gazettes, and as a consequence, a water-soluble polymer having sufficiently high abilities for use as the dispersant, scaling inhibitor, detergent builder, etc. can not be obtained.

On the other hand, it has been known that an (acrylic acid/acrylate–maleic acid/maleate) copolymer having a number of carboxyl groups exhibits excellent chelating function and dispersing function, and therefore, has been used in diversified fields as a detergent builder, a scaling inhibitor, an inorganic pigment dispersant, a fiber treatment agent, a chelating agent, etc.

When used as the detergent builder, desired basic abilities of the copolymer are a calcium ion trapping ability and a clay dispersing ability. The calcium ion trapping ability is used to determine an amount of calcium ions the copolymer can trap in a series where calcium ions exist exceedingly. On the other hand, the clay dispersing ability is indicated as turbidity of a supernatant obtained by mixing clay and the copolymer with an aqueous solution of a specific chemical composition and dispersing the clay in the aqueous solution, and the higher the turbidity, the better the clay dispersing ability of the copolymer. Also, in general, the greater a molecular weight, the better the calcium ion trapping ability and the lower the clay dispersing ability. On the other hand, the smaller a molecular weight, the better the clay dispersing ability and the lower the calcium ion trapping ability. Thus, it has been very difficult to improve both the abilities in good balance, and many solution methods have been proposed to date.

For example, PCT Unexamined Patent Publication No. WO95/03342 published on Feb. 2, 1995 (Japanese Patent No. 2574144) discloses a maleic acid copolymer having a calcium ion trapping ability of 300 mgCaCO$_3$/g or greater and a clay dispersing ability of 1.2 or greater, and a manufacturing method thereof. According to the disclosure of this Patent, the clay dispersing ability was measured by using clean water of Himeji City, Japan. Most of water supplied in Japan, including the above clean water of Himeji City, has a relatively low hardness with 20–50 ppm in CaCO$_3$ conversion, and the conditions for the dispersing ability are not as strict as those for the calcium ion trapping ability. Hence, Japanese Patent No. 2574144 mainly discusses the calcium ion trapping ability.

However, water supplied in many regions outside Japan has a high hardness. For example, a hardness of water supplied in the Unites States and China is as high as 200 ppm (in CaCO$_3$ conversion). The copolymer disclosed in Japanese Patent No. 2574144 can exhibit an excellent dispersing ability when used in low hard water, such as water supplied in Japan, but can not do so when used in high hard water. Compared with improvements of the dispersing ability in low hard water, it is far more difficult to improve the clay dispersing ability in high hard water, and the copolymer disclosed in Japanese Patent No. 2574144 focused on the improvement of the calcium ion trapping ability can not overcome the above problem.

Besides Japanese Patent No. 2574144, many manufacturing methods of an (acrylic acid/acrylate–maleic acid/maleate) copolymer have been proposed. For example, Japanese Laid-open Patent Application No. 235313/1988 (Japanese Official Gazette, Tokukaisho No. 63-235313, published on Sep. 30, 1988) discloses a manufacturing method of a maleic acid copolymer which contains acrylic acid/acrylate and maleic acid in a mole ratio ranging from 100/200 to 100/25 and has a sulfonic acid group at an end terminal. More specifically, disclosed in this Gazette is a method of copolymerizing acrylic acid/acrylate with maleic acid in an aqueous solution of a pH maintained in a range between 2.5 and 6.5 using a polymerization initiator produced by reacting sulfurous acid or bisulfurous acid, or a salt thereof with an oxidant. The resulting copolymer exhibits an excellent scaling inhibiting ability, but when used as a detergent, there arises a problem that it exhibits a poor clay dispersing ability due to its high ratio of maleic acid, especially with use in high hard water.

Also, Japanese Laid-open Patent Application No. 67706/1983 (Japanese Official Gazette, Tokukaisho No. 58-67706, published on Apr. 22, 1983) discloses a method of copolymerizing unsaturated monocarboxylic acid/monocarboxylate, such as acrylic acid, with unsaturated dicarboxylic acid/dicarboxylate, such as maleic acid, in a weight ratio of 90–40/10–60 in the presence of a water-soluble initiator. However, according to examples disclosed therein, maleic acid is used at a high ratio and a hydrogen peroxide alone is used as the initiator. Hence, when used as a detergent, there arises a problem that the resulting copolymer exhibits a poor clay dispersing ability, especially with use in high hard water.

SUMMARY OF THE INVENTION

It is therefore a first object of the present invention to provide (1) a low-molecular-weight (meth)acrylic acid polymer having not only excellent dispersing ability and chelating ability, but also high resistance to gelling by introducing a sulfonic acid group quantitatively to an end terminal and polymerizing a monomer composition containing (meth) acrylic acid under acid conditions, and (2) an efficient manufacturing method of such a polymer.

To fulfil the first and other objects, the inventors of the present invention conducted an assiduous study, and in due course, discovered that (meth)acrylic acid polymer, which contains at least 50 mol % of (meth)arylic acid and has a sulfonic acid group at an end terminal with an anti-gelling ability smaller than 2.0, can serve as a low-molecular-weight water-soluble polymer having not only excellent dispersing ability and chelating ability, but also high resistance to gelling.

The inventors of the present invention also discovered that a low-molecular-weight water-soluble polymer having not only excellent dispersing ability and chelating ability, but also high resistance to gelling can be manufactured efficiently by polymerizing 60 mol % or more of a hydrophilic monomer containing at least 50 mol % of (meth) acrylic acid using a combination of at least one kind of persulfate salts and at least one kind of bisulfite salts as an initiator under acid conditions that a pH is smaller than 5 and a degree of neutralization is smaller than 40 mol %.

The inventors of the present invention achieved the present invention when they further discovered that a low-molecular-weight water-soluble polymer having not only excellent dispersing ability and chelating ability, but also high resistance to gelling can be manufactured efficiently by polymerizing 60 mol % or more of a hydrophilic monomer containing at least 50 mol % of (meth)acrylic acid by means of dropping under the acid conditions that a pH is smaller than 5 and a degree of neutralization is smaller than 40 mol %, while setting a solid concentration when the dropping of the monomer ends to 40% or higher and a weight average molecular weight to a range between 3,000 and 15,000.

A second object of the present invention is to provide an (acrylic acid/acrylate–maleic acid/maleate) copolymer having a high clay dispersing ability in high hard water and a high calcium ion trapping ability and a manufacturing method thereof, and a detergent composition.

To fulfill the second and other objects, an (acrylic acid/acrylate–maleic acid/maleate) copolymer of the present invention is characterized by having a clay dispersing ability in high hard water of 50% or greater, and a calcium ion trapping ability of 270 mgCaCO$_3$/g or greater. Also, a manufacturing method of an (acrylic acid/acrylate–maleic acid/maleate) copolymer of the present invention is a method of polymerizing a monomer component, mainly containing an acrylic acid/acrylate and a maleic acid/maleate, in an aqueous solvent in the presence of at least a polymerization initiator, which is characterized in that: the monomer component, polymerization initiator, aqueous solvent, and other raw materials when needed are used in amounts such that a theoretical solid concentration of the resulting polymer is 40 wt % or higher;

a mole ratio of the used amounts of acrylic acid/acrylate to maleic acid/maleate is 95–80/5–20; and (1) a combination of persulfate salts and bisulfite salts and/or (2) a combination of hydrogen peroxide and polyvalent metal ions are used as a polymerization initiator.

The other objects, features, advantages of the present invention will be apparent from the ensuing description, and the benefits of the present invention will be understood explicitly from the following explanation.

DESCRIPTION OF THE EMBODIMENTS

First, the following will explain a relation of physical properties of a (meth)acrylic acid polymer or an (acrylic acid/acrylate–maleic acid/maleate) copolymer of the present invention, such as resistance to gelling, a clay dispersing ability, and a calcium ion trapping ability, with a washing effect of a detergent composition.

The resistance to gelling indicates the extent to which a (meth)acrylic acid polymer has not turned into gel with a hard water content, namely, calcium ions. In other words, it is an indicator showing the extent to which water-solubility of the (meth)acrylic acid polymer is maintained and a degree of contribution to the clay dispersing ability and calcium ion trapping ability. The resistance to gelling of the polymer varies considerably with increasing temperatures. For this reason, the resistance of gelling is measured with hot water of 90° C. Because the washing is generally done with hot water of 50° C. or higher in Europe, the resistance to gelling is one of the important factors when evaluating a washing effect of a detergent composition at high temperatures.

The clay dispersing ability is an indicator showing a level of abilities of the (acrylic acid/acrylate–maleic acid/maleate) copolymer in dispersing stains of inorganic particles, namely, dirt stains. A detergent composition with a higher clay dispersing ability can remove and disperse dirt stains adhering to the fibers in a more satisfactory manner, and exhibits an excellent effect of preventing dispersed dirt stains from adhering to the fibers again. The clay dispersing ability is measured at room temperature with water of 25° C. Hence, the clay dispersing ability can be defined as a factor used to evaluate a washing effect of the detergent composition at low temperatures.

The calcium ion trapping ability is an indicator showing a level of the abilities of the (acrylic acid/acrylate–maleic acid/maleate) copolymer in trapping (chelating) a hard water content, such as calcium ions. A detergent composition with a poor calcium ion trapping ability deteriorates detergency considerably, because a surfactant mainly composing the detergent composition is turned into gel by the hard water content and deposits.

As has been discussed, of the properties including the resistance to gelling, clay dispersing ability and calcium ion trapping ability, the most important factor to evaluate a washing effect of the detergent composition at high temperatures is the resistance to gelling, and the most important factor to evaluate the washing effect at low temperatures is the clay dispersing ability. The inventors of the present invention achieved the present while they conducted an assiduous study on a (meth)acrylic acid polymer and an (acrylic acid/acrylate–maleic acid/maleate) copolymer used as an optimal detergent composition under the above conditions.

Embodiment 1

The following will explain in detail an example embodiment of the present invention. More specifically, the following will explain a (meth)acrylic acid polymer of the present invention and a manufacturing method thereof.

A monomer composition, from which a (meth)acrylic acid polymer of the present embodiment is manufactured, is composed of a first monomer (hereinafter, referred to as Monomer (I)), and when needed, a second monomer (hereinafter, referred to as Monomer (II)).

Here, a (meth)acrylic acid is used as Monomer (I), and a water-soluble monoethylenic unsaturated monomer is used as Monomer (II). Ratios of Monomers (I) and (II) based on a total weight of the monomer composition are preferably in a range between 50 and 100 mol % and in a range between 0 and 50 mol %, respectively, and more preferably in range between 70 and 100 mol % and in a range between 0 and 30 mol %, respectively.

Examples of (meth)acrylic acid used suitably as Monomer (I) include acrylic acid, methacrylic acid, and a mixture thereof.

Examples of the water-soluble monoethylenic unsaturated monomer used as Monomer (II) include, but not limited to:

salts of Monomer (I), namely (meth)acrylic acid, which are partially or completely neutralized with alkali metal (monovalent metal), such as sodium and potassium, or alkali earth metal (bivalent metal);

salts of (meth)acrylic acid, which are partially or completely neutralized with ammonia, or organic amines, such as monoethanol amine and triethanol amine;

monoethylenic unsaturated aliphatic monocarboxylic acid, such as crotonic acid and α-hydroxyacrylic acid;

salts of the monoethylenic unsaturated monocarboxylic acid, which are partially or completely neutralized with alkali metal or alkali earth metal;

salts of the monoethylenic unsaturated monocarboxylic acid, which are partially or completely neutralized with ammonia or the organic amines;

monoethylenic unsaturated aliphatic dicarboxylic acid, such as maleic acid, fumaric acid, itaconic acid, and citraconic acid;

salts of the monoethylenic unsaturated dicarboxylic acid, which are partially or completely neutralized with alkali metal or alkali earth metal;

salts of the monoethylenic unsaturated dicarboxylic acid, which are partially or completely neutralized with ammonia or the organic amines;

monoethylenic unsaturated monomers having a sulfonic acid group, such as vinyl sulfonic acid, allylsulfonic acid, methallylsulfonic acid, styrene sulfonic acid, 2-acrylamide-2-methylpropane sulfonic acid, 3-allyloxy-2-hydroxypropane sulfonic acid, sulfoethyl (meth)acrylate, sulfopropyl(meth)acrylate, 2-hydroxysulfopropyl(meth)acrylate, and sulfoethyl maleimide;

salts of the monoethylenic unsaturated monomers, which are partially or completely neutralized with alkali metal or alkali earth metal;

salts of the monoethylenic unsaturated monomers, which are partially or completely neutralized with ammonia or the organic amines;

unsaturated hydrocarbons containing a hydroxyl group, such as 3-methyl-2-butene-1-ol(prenol), 3-methyl-3-butene-1-ol(isoprenol), 2-methyl-3-butene-2-ol (isoprene alcohol), 2-hydroxyethyl (meth)acrylate, polyethylene glycol mono(meth)acrylate, polypropylene glycol mono(meth)acrylate, polyethylene glycol monoisoprenol ether, polypropylene glycol monoisoprenol ether, polyethylene glycol monoallyl ether, polypropylene glycol monoallyl ether, glycerol monoallyl ether, α-hydroxy acrylic acid, N-methylol (meth)acrylamide, glycerol mono(meth)acrylate, and vinyl alcohol;

amide monomers, such as (meth)acrylamide and t-butyl (meth)acrylamide;

cationic monomers, such as dimethyl aminoethyl (meth)acrylate and dimethyl aminopropyl(meth)acrylamide;

nitrile monomers, such as (meth)acrylonitrile;

phosphorous-content monomers, such as (meth)acrylamide methane phosphonic acid, (meth)acrylamide methane methylphosphonate, and 2-(meth)acrylamide-2-methylpropane phosphonic acid; etc.

One member or a mixture of two or more members selected from these example compounds can be used effectively as Monomer (II). Of all these examples, the most preferred are one member or a mixture of two or more members selected from monoethylenic unsaturated aliphatic dicarboxylic acid, monoethylenic unsaturated monomer having a sulfonic acid group, and partially or completely neutralized salts thereof.

In addition to Monomers (I) and (II), the monomer composition may include a hydrophobic compound as an additional monomer. Examples of such a hydrophobic compound include, but not limited to: (meth)acrylic ester, styrene, 2-methyl styrene, vinyl acetate, etc. However, when a hydrophobic monomer is used as an additional monomer, resistance to gelling of the resulting (meth)acrylic acid polymer may be deteriorated considerably, and for this reason, it is preferable not to use an additional monomer whenever possible.

When a hydrophobic monomer is included as an additional monomer, a ratio of the hydrophobic monomer has to be smaller than 40 mol % based on a total weight of all the monomers contained in the polymerization reaction series. In other words, a ratio of the hydrophilic monomers in total, namely Monomers (I) and (II), has to be 60 mol % or more based on a total weight of all the monomers contained in the polymerization reaction series. If a ratio of the hydrophobic monomer exceeds 40 mol % based on the total weight of all the monomers, resistance to gelling of the resulting (meth)acrylic acid polymer are deteriorated without exception, thereby making it impossible to obtain a (meth)acrylic acid polymer of the present embodiment having high resistance to gelling.

A solvent used in the polymerization reaction series when polymerizing Monomers (I) and (II) in the present embodiment is preferably water-soluble, and most preferably water.

Also, to improve solubility of Monomers (I) and (II) to the solvent, an organic solvent may be added to the solvent in an amount such that gives no adverse effect to the polymerization of each monomer.

Examples of the organic solvent include:

lower alcohols, such as methanol, ethanol, and isopropyl alcohol;

amides, such as dimethylformamide;

ethers, such as diethyl ether and dioxane; etc.

One member or a mixture of two or more members selected from these example compounds can be used effectively.

In the present embodiment, a combination of one or more than one kind of persulfate salts, and one or more than one kind of bisulfite salts are used as an initiator series used to polymerize Monomers (I) and (II). A weight ratio of added amounts of bisulfite salts to persulfate salts is preferably in a range between 0.5 and 5 to 1, and more preferably in a range 1 and 4 to 1.

If a ratio of added bisulfite salts to persulfate salts is less than 0.5 to 1, an effect of bisulfite salts can not be fully exhibited. In such a case, a sulfonic acid group can not be introduced quantitatively to an end terminal, and a weight average molecular weight of the resulting (meth)acrylic acid polymer tends to increase.

On the other hand, if a ratio of added bisulfite salts to added persulfate salts is more than 5 to 1, bisulfite salts are added excessively and wasted in the polymerization reaction series while an effect of bisulfite salts is not enhanced in a matching ratio to an increased amount. Moreover, bisulfite salts are decomposed in the polymerization reaction series, thereby yielding an unwanted sulfurous acid gas.

It is preferable that a total of added amounts of persulfate salts and bisulfite salts is in a range between 2 and 20 g, and more preferably, in a range between 6 and 1 g, with respect to 1 mole of the monomer. When persulfate salts and bisulfite salts are added within the above-specified range, a sulfonic acid group can be introduced quantitatively to an end terminal of the resulting (meth)acrylic acid polymer.

If an added amount of persulfate salts and bisulfite salts is too small, a sulfonic acid group can not be introduced quantitatively to an end terminal of the resulting (meth)acrylic acid polymer, and a weight average molecular weight of the resulting polymer tends to increase. On the other hand, if an added amount of persulfate salts and bisulfite salts is too large, an effect of persulfate salts and bisulfite salts is not enhanced in a matching ratio to an increased amount, and purity of the resulting (meth)acrylic acid polymer is undesirably reduced.

Examples of persulfate salts include sodium persulfate, potassium persulfate, and ammonium persulfate, and examples of bisulfite salts include sodium bisulfate, potassium bisulfate, and ammonium bisulfite.

As has been discussed, by polymerizing a monomer composition containing, at least, 50 mol % or more of Monomer (I) and 0–50 mol % of Monomer (II) under acid conditions detailed below using persulfate salts and bisulfite salts as an initiator series, a sulfonic acid group can be introduced quantitatively to an end terminal of a (meth)acrylic acid polymer of the present embodiment. Consequently, the (meth)acrylic acid polymer of the present embodiment does to coagulate with metal salts, such as calcium, thereby exhibiting satisfactory resistance to gelling. A method of evaluating the resistance to gelling will be described below.

Conventionally, a polymer having resistance to gelling has an extraordinary small molecular weight among lowmolecular-weight polymers. In other words, in order to obtain satisfactory resistance to gelling, a molecular weight of a low-molecular-weight polymer has to be further reduced. However, if a molecular weight is too small, the polymer can not be suitably used as a dispersing agent, a scaling inhibitor, a detergent builder, etc.

In contrast, a sulfonic acid group can be introduced quantitatively to an end terminal of the (meth)acrylic acid polymer of the present embodiment during the manufacturing process. Hence, although the (meth)acrylic acid polymer of the present embodiment is defined as a low-molecular-weight polymer, its molecular weight is relatively large compared with a molecular weight of a conventional polymer exhibiting resistance to gelling. However, regardless of this fact, the (meth)acrylic acid polymer of the present embodiment can exhibit satisfactory resistance to gelling, and therefore, can be suitably used as a dispersant, a scaling inhibitor, a detergent builder, etc.

If a sulfonic acid group can be introduced quantitatively, it means that persulfate salts and bisulfite salts used as the initiator series are functioning as an initiator in a very satisfactory manner. Thus, the initiator does not have to be added exceedingly to the polymerization reaction series, and in this manner, an increase in manufacturing costs of the polymer can be curbed, thereby improving the manufacturing efficiency.

Further, if bisulfite salts are added to the initiator series, an excessive increase in molecular weight of the resulting polymer can be curbed. Hence, by adding bisulfite salts to the polymerization reaction series, a low-molecular-weight polymer can be manufactured efficiently.

A combination of persulfate salts and bisulfite salts is suitably used as the initiator series when manufacturing the (meth)acrylic acid polymer of the present embodiment, and for the manufacturing method thereof. However, the initiator series is not limited to the above combination, and any initiator series can be used as long as it can introduce a sulfonic acid group and yield a low-molecular-weight polymer in one phase.

A reaction temperature when polymerizing Monomers (I) and (II) is 90° C. or higher, and more preferably around a boiling point of a solvent in an aqueous solvent. A pressure during the polymerization reaction is not especially limited, and the polymerization reaction can take place under normal (atmospheric) pressure, reduced pressure, or applied pressure.

The polymerization reaction of Monomers (I) and (II) takes place under acid conditions, that is, a pH smaller than 5 and a degree of neutralization smaller than 40 mol %. When Monomer (I) alone is used as the monomer for polymerization, a degree of neutralization is preferably smaller than 20 mol %, and more preferably 10 mol % or smaller. On the other hand, when Monomers (I) and (II) are used for polymerization, Monomer (II) can be charged as the original charge of the polymerization either partially or entirely, and a degree of neutralization during the polymerization reaction is preferably smaller than 30 mol %, and most preferably in a range between 5 mol % inclusive and 30 mol % exclusive.

In a conventional method, if the polymerization reaction takes place under the condition of pH of 5 or higher and a degree of neutralization of 40 mol % or higher, a viscosity of an aqueous solution of the polymerization reaction series increases remarkably with the progress of the polymerization. Thus, there arises a problem that a molecular weight of the resulting polymer increases exceedingly, and a desired low-molecular-weight polymer can not be obtained.

However, by polymerizing a monomer under the condition of pH smaller than 5 and a degree of neutralization smaller than 40 mol %, a low-molecular-weight polymer can be manufactured in a satisfactory manner without increasing a viscosity of an aqueous solution of the polymerization reaction series. Moreover, compared with the conventional method, the polymerization reaction can take place under a higher concentration condition, thereby improving a manufacturing efficiency markedly.

In particular, according to the manufacturing method of the polymer of the present embodiment, by conducting the polymerization reaction under the aforementioned acid conditions, the polymerization can be completed in one phase at a high concentration. Hence, a concentrating step, which should be taken occasionally in the conventional manufacturing method, can be omitted. Consequently, not only can the productivity of the (meth)acrylic acid polymer be improved considerably, but also an increase in the manufacturing costs can be curbed.

As has been discussed, by taking the reactivity of each Monomer into consideration, the most preferable degree of neutralization when copolymerizing Monomers (I) and (II) is in a range between 5 mol % inclusive and 30 mol % exclusive. Under the conditions where a degree of neutralization is in the above-specified range, Monomers (I) and (II) can be copolymerized in an optimal manner.

In the manufacturing method of the polymer of the present embodiment, in order to conduct the polymerization under the acid conditions, a degree of neutralization of the resulting (meth)acrylic acid polymer can be set by adding an alkali component adequately when the polymerization ends, and examples of such an alkali component include:

alkali metal hydroxides, such as a sodium hydroxide and a potassium hydroxide;

alkali earth metal hydroxides, such as a calcium hydroxide and a magnesium hydroxide;

ammonia;

organic amines, such as monoethanol amine, diethanol amine, and triethanol amine; etc.

One member or a mixture of two or more members selected from these example alkali components can be used effectively.

It is possible to set a degree of neutralization by subjecting a (meth)acrylate polymer obtained by a conventional complete or partial neutralization method to desalting treatment. However, this method is not practical, because adding the desalting step complicates the manufacturing process and increases the manufacturing costs.

In order to conduct the polymerization, Monomers (I) and (II), and persulfate salts and bisulfite salts used as the initiator series are dropped to an aqueous solvent continuously over their respective predetermined dropping times. The predetermined dropping times are preferably in a range between 30 and 240 minutes, and more preferably in a range between 45 and 180 minutes. Note that Monomer (II) can be charged as the original charge, either partially or entirely.

Dropping times outside of the above specified range are not preferable for the following reason. That is, if the dropping time is 30 minutes or shorter, an effect of persulfate salts and bisulfite salts added as the initiator series can not be exhibited effectively. Thus, a sulfonic acid group can not be introduced quantitatively to an end terminal of the resulting (meth)acrylic acid polymer, and a weight average molecular weight of the polymer tends to increase. On the other hand, if the dropping time is over 240 minutes, the productivity of the (meth)acrylic acid polymer is deteriorated considerably.

A dropping rate for each of the above components is not especially limited. For example, the dropping rate may be constant throughout the dropping, or increased or decreased over lapse of time as the case may be. However, each of the above component is dropped in such a manner that a concentration of solids in the polymerization reaction series, that is, a concentration of polymerized solids obtained from the monomer, is 40% or higher when the dropping ends. In short, the above components are dropped so as to attain a solid concentration of 40% or higher when the polymerization reaction ends.

If a solid concentration in the polymerization reaction series is increased in the conventional method, a viscosity of a reaction solution increases considerably with the progress of the polymerization reaction, and there arises a problem that a molecular weight of the resulting polymer is increased markedly. However, in the present embodiment, the polymerization reaction takes place on the acid side (a pH smaller than 5 and a degree of neutralization smaller than 40 mol %). Hence, an increase in viscosity of a reaction solution with the progress of the polymerization reaction can be curbed. Consequently, even when the polymerization takes place under a high-concentration condition, a low-molecular-weight polymer can be obtained, thereby remarkably improving the manufacturing efficiency of the polymer.

A weight average molecular weight of the resulting (meth)acrylic acid polymer is in a range between 3,000 and 15,000, and more preferably in a range between 3,000 and 10,000. When a weight average molecular weight is in the above-specified range, the (meth) acrylic acid polymer can most effectively exhibit its abilities, such as the dispersing ability, chelating ability, and resistance to gelling.

Generally, a water-soluble polymer, which has a low molecular weight of 1,000 or larger and used as a dispersant, a scaling inhibitor and the like, exhibits better dispersing ability and resistance to gelling as its molecular weight is reduced (approximated to 1,000). On the other hand, the water-soluble polymer exhibits better chelating ability as its molecular weight increases. For this reason, it has been difficult to improve all the dispersing ability, chelating ability, and resistance to gelling of a conventional water-soluble polymer satisfactorily in good balance.

Contrarily, the (meth)acrylic acid polymer of the present embodiment can exhibit satisfactory dispersing ability and resistance to gelling even when its molecular weight is relatively large, because a sulfonic acid group is introduced to an end terminal. In particular, the resistance to gelling is relatively fair when its large molecular weight is concerned. Hence, the (meth)acrylic acid polymer of the present embodiment can show excellent dispersing ability and resistance to gelling in addition to the chelating ability as good as the one exhibited by a conventional (meth)acrylic acid polymer having substantially the same molecular weight.

Conventionally, in order to manufacture a low-molecular-weight water-soluble polymer which can exhibit resistance to gelling, a larger amount of the initiator has to be added to the polymerization reaction series compared with a case of manufacturing a high-molecular-weight polymer. However, with the (meth)acrylic acid polymer of the present embodiment, an increase in amount of the initiator added to the polymerization reaction series can be curbed because its molecular weight is relatively large. Thus, from the standpoint of cost saving, the manufacturing method of the (meth)acrylic acid polymer of the present embodiment excels the conventional manufacturing methods of a water-soluble polymer exhibiting resistance to gelling.

In the present embodiment, the resistance to gelling is evaluated as an anti-gelling ability Q-value, which is computed using a degree of gelling and a weight average molecular weight of the polymer in accordance with the following equation:

$$Q = \frac{\text{degree of gelling} \times 10^5}{\text{weight average molecular weight}}.$$

The (meth)acrylic acid polymer of the present embodiment attains an anti-gelling ability Q-value of 2.0 or smaller. When the anti-gelling ability Q-value is in the above-specified range, the polymer exhibits very satisfactory resistance to gelling.

A degree of gelling according to the above equation can be measured by a known method of measuring a degree of gelling of a polymer. For example, a degree of gelling is measured by the following manner. That is, a sample liquid is prepared by adding a low-concentration aqueous solution (for example, 1 wt %) of the (meth)acrylic acid polymer of the present embodiment and an aqueous solution of calcium chloride to a buffer solution followed by blending, and the sample liquid is allowed to stand for a predetermined time at a predetermined temperature (for example, for 1 hour at 90° C.), after which a degree of light absorption of the sample liquid is measured in a UV ray wavelength range.

In other words, the (meth)acrylic acid polymer of the present embodiment is a polymer obtained by polymerizing 50–100 mol % of (meth)acrylic acid, and when necessary, 0–50 mol % of a water-soluble monoethylenic unsaturated monomer which can copolymerize with (meth)acrylic acid in an aqueous solution, and the polymer has a sulfonic acid group at an end terminal and an anti-gelling ability Q-value smaller than 2.0 defined as follows:

$$Q = \frac{\text{degree of gelling} \times 10^5}{\text{weight average molecular weight}}.$$

As has been discussed, the (meth)acrylic acid polymer of the present embodiment has a sulfonic acid group at an end terminal and good resistance to gelling. Although the polymer is classified as a low-molecular-weight polymer, its molecular weight is relatively large compared with a conventional polymer having resistance to gelling. However, regardless of this fact, the polymer can exhibit improved dispersing ability and chelating ability because of a sulfonic acid group introduced to an end terminal while exhibiting further better resistance to gelling (compared with satisfactory resistance to gelling of the conventional polymer). Consequently, the polymer can be used suitably as an inorganic pigment dispersant, a scaling inhibitor, a detergent builder, etc.

The manufacturing method of the (meth)acrylic acid polymer of the present embodiment is a method of polymerizing 60 mol % or more of a hydrophilic monomer containing 50 mol % or more of (meth) acrylic acid by using a combination of at least one kind of persulfate salts and at least one kind of bisulfite salts as the initiator series under the conditions that a pH is smaller than 5 and a degree of neutralization is smaller than 40 mol %.

Also, the manufacturing method of the (meth)acrylic acid polymer of the present embodiment is a method of polymerizing 60 mol % or more of a hydrophilic monomer containing 50 mol % or more of (meth)acrylic acid under the conditions that a pH is smaller than 5 and a degree of neutralization is smaller than 40 mol % in such a manner that a solid concentration when the polymerization ends is 40% or higher and a weight average molecular weight of the resulting polymer is in a range between 3,000 and 15,000.

By these methods, a low-molecular-weight polymer can be manufactured in a satisfactory manner while suppressing an increase in viscosity of an aqueous solution of the polymerization reaction series. Moreover, the manufacturing efficiency can be improved significantly because the polymerization reaction can proceed under a higher concentration condition than in the conventional method.

Further, the manufacturing method of the (meth)acrylic acid polymer of the present embodiment is a method of polymerizing a hydrophilic monomer containing (meth) acrylic acid under the acid conditions (a pH smaller than 5 and a degree of neutralization smaller than 40 mol %) by using a combination of at least one kind of persulfate salts and at least one kind of bisulfite salts as the initiator series.

Accordingly, a sulfonic acid group can be introduced quantitatively to the resulting (meth)acrylic acid polymer. If a sulfonic acid group can be introduced quantitatively, it means that persulfate salts and bisulfite salts used as the initiator series are functioning as an initiator in a very satisfactory manner. Thus, the initiator does not have to be added exceedingly to the polymerization reaction series, and in this manner, an increase in manufacturing cost of the polymer can be curbed, thereby improving the manufacturing efficiency.

In addition, if a solid concentration is high when the polymerization reaction ends, the polymerization can take place in one phase at a high concentration. Hence, a concentrating step, which should be taken occasionally in the conventional manufacturing method, can be omitted. Consequently, not only can the productivity of the (meth) acrylic acid polymer be improved considerably, but also an increase in the manufacturing costs can be curbed.

Further, it is preferable to arrange in such a manner that a polymerized solid concentration when the polymerization reaction ends is 40% or higher, and a weight average molecular weight of the resulting polymer is in a range between 3,000 and 15,000.

Consequently, a (meth)acrylic acid polymer (low-molecular-weight polymer) having not only excellent dispersing ability and chelating ability, but also high resistance to gelling can be manufactured efficiently. In other words, manufacturing efficiency of the polymer can be improved significantly (extremely satisfactory). Thus, it has become possible to manufacture a high-quality and low-cost polymer which can be suitably used as an inorganic pigment dispersant, a scaling inhibitor, a detergent builder, etc. Further, since an increase in amount of the initiator added to the polymerization reaction series can be curbed, the cost can be saved compared with the conventional polymer.

Furthermore, the manufacturing method of the (meth) acrylic acid polymer of the present embodiment is the method, wherein, when using a combination of at least one kind of persulfate salts and at least one kind of bisulfite salts, a weight ratio of bisulfite salts to persulfate salts is in a range between 0.5 and 5 to 1, and a total amount of persulfate salts and bisulfite salts added to the polymerization reaction series is in a range between 2 and 20 g in equivalence to 1 mole of the monomer.

Accordingly, by adding bisulfite salts in the above-specific range to a predetermined amount of the initiator series in addition to the persulfate salts, an exceeding increase in a molecular weight of the resulting polymer can be prevented. Consequently, adding bisulfite salts to the polymerization reaction series makes it possible to manufacture a low-molecular-weight polymer efficiently.

Embodiment 2

The following will explain in detail another example embodiment of the present invention. To be more specific, the following will explain an (acrylic acid/acrylate–maleic acid/maleate) copolymer and a manufacturing method thereof, and a detergent composition of the present invention.

An (acrylic acid/acrylate–maleic acid/maleate) copolymer of the present embodiment attains a clay dispersing ability of 50% or greater in high hard water, and a calcium ion trapping ability of 270 $mgCaCO_3/g$ or greater. A preferable clay dispersing ability in high hard water is 55% or grater and more preferably 60% or greater. A higher clay dispersing ability in high hard water is more preferable, but when a clay dispersing ability of a copolymer exceeds 90%, productivity may be reduced or the cost may be increased. A preferable calcium ion trapping ability is 300 $mgCaCo_3/g$ or greater. A higher calcium ion trapping ability is more preferable, but when a calcium ion trapping ability of a copolymer exceeds 450 $mgCaCO_3/g$, productivity may be reduced or the cost may be increased. In the present embodiment, a clay dispersing ability in high hard water and a calcium ion trapping ability are measured by a method described in examples set forth below.

A copolymer excellent in both a clay dispersing ability in high hard water and a calcium ion trapping ability is a new copolymer which has never been existed. In particular, a "clay dispersing ability in high hard water" is a new indicator discovered by the inventors of the present invention during their assiduous study, and a value of the "clay dispersing ability in high hard water" can not be predicted from a conventionally known indicator, namely a "clay dispersing ability in low hard water" (20–50 ppm in $CaCO_3$ conversion) Copolymers having substantially the same "clay dispersing ability in low hard water" often shows noticeable differences when compared with reference to a more strict condition, that is, the "clay dispersing ability in high hard water". The copolymer of the present embodiment can show an excellent "clay dispersing ability in high hard water", but also shows a high "calcium ion trapping ability" at the same time, thereby exhibiting an excellent cleaning ability in good balance.

Here, let MA be a ratio (mol %) of maleic acid/maleate units and Mw be a weight average molecular weight in the copolymer of the present embodiment, then, mainly from the standpoint of the clay dispersing ability in high hard water, it is preferable that a product, MA×Mw, is 150,000 or smaller, and Mw is 20,000 or smaller. This is because the calcium ion trapping ability tends to increase but the clay dispersing ability tends to decrease as a ratio of maleic acid/maleate units or a molecular weight increases. Also, the upper limit of the weight average molecular weight is capped more strictly as a ratio of maleic acid/maleate units increases. For example, when MA is 7.5 mol % or smaller, Mw is preferably 20,000 or smaller; when MA is 10 mol %, Mw is preferably 15,000 or smaller; and when MA is 15 mol %, Mw is preferably 10,000 or smaller.

To obtain a clay dispersing ability in high hard water and a calcium ion trapping ability satisfactorily in good balance, a mole ratio of acrylic acid/acrylate units to maleic acid/maleate units in the copolymer of the present embodiment is preferably 95–80/5–20, and more preferably 90–85/10–15. When a ratio of maleic acid/maleate units is below the above-specified range, a calcium ion trapping ability is deteriorated, and on the other hand, when a ratio of acrylic acid/acrylate units is below the above-specified range, the clay dispersing ability in high hard water is deteriorated.

The aforementioned ratio of maleic acid/maleate units, and mole ratio of acrylic acid/acrylate units and maleic acid/maleate units in the present copolymer are controlled by a charging ratio.

Thus, to obtain a copolymer of the present embodiment, it is preferable to polymerize a monomer component containing maleic acid/maleate at a low ratio (containing acrylic acid/acrylate at a high ratio) in such a manner as to maintain a not too large weight average molecular weight. Also, to attain a better clay dispersing ability in high hard water, it is preferable to conduct the polymerization reaction in such a manner as to narrow a molecular weight distribution of the polymer. Conventionally, when trying to improve both the clay dispersing ability in low hard water and the calcium ion trapping ability in good balance, a focus has been placed on the improvement of the latter. For this reason, a monomer component containing a large amount of maleic acid/maleate has been used. Since maleic acid/maleate has a low reactivity, polymerization is generally conducted in a high polymerization concentration (theoretical solid concentration of the polymer when the polymerization ends), and as a result, a polymer having a relatively low molecular weight is obtained. However, if the same method is adopted for a monomer component containing a large amount of acrylic acid/acrylate and the polymerization is conducted in a high concentration, the resulting polymer has a very large molecular weight because, unlike maleic acid/maleate, acrylic acid/acrylate has a very good reactivity. Conversely, if the polymerization is conducted in a low concentration, the resulting polymer has a low molecular weight but a broad molecular weight distribution, thereby exhibiting a poor clay dispersing ability in high hard water.

In other words, in order to obtain a copolymer of the present embodiment, it is necessary to regulate the polymerization conditions strictly, and as a result of an assiduous study, the inventors of the present invention discovered a manufacturing method described below. So, the following will describe a manufacturing method of the present embodiment.

In the manufacturing method of the present embodiment, a monomer component mainly composed of acrylic acid/acrylate and maleic acid/maleate is used. Herein, "mainly composed of" means a total weight of acrylic acid/acrylate and maleic acid/maleate accounts for 85 mol % or more, preferably 90 mol % or more, and more preferably 95 mol % or more, based on a total weight of the monomer component.

Acrylic acid or acrylate, or a mixture thereof can be used, but acrylic acid is more preferable. Examples of acrylate include:

alkali metal salts acrylates, such as sodium acrylate and potassium acrylate;

salts of ammonium acrylate or acrylic acid, which are completely neutralized with organic amines, such as monoethanol amine and triethanol amine; etc. it is preferable to drop 70 wt % or more, more preferably 90 wt % or more, and most preferably a whole amount of acrylic acid/acrylate to a reaction vessel.

Although it will be described below, when a combination of persulfate salts and bisulfite salts is used as a polymerization initiator, it is preferable that a degree of neutralization when the dropping ends is 15 mol % or lower, and more preferably 10 mol % or lower with respect to a total weight of acrylic acid and maleic acid. When a combination of hydrogen peroxide and polyvalent metal ions is used as a polymerization initiator, a degree of neutralization when the dropping ends is preferably 30 mol % or lower, and more preferably 20 mol % or lower with respect to a total weight of acrylic acid and maleic acid. The neutralization may be conducted before acids and bases are supplied to the reaction vessel, or in the reaction vessel by supplying acids and bases separately.

Any of maleic anhydride, maleic acid, and maleate, a mixture of two or more members selected therefrom can be used as maleic acid/maleate referred herein. Examples of maleate include:

salts of maleic acid/maleic anhydride, which are partially or completely neutralized with alkali metal, such as sodium and potassium, namely, mono- or di-alkali metal salts of maleic acid;

mono- or di-ammonium of maleic acid or salts of maleic acid/maleic anhydride, which are partially or completely neutralized with organic amines, such as monoethanol amine and triethanol amine; etc.

It is preferable to charge 50 wt % or more, more preferably 80 wt % or more, and most preferably a whole amount of maleic acid/maleate to a reaction vessel as an original charge.

Although it will be described below, when a combination of persulfate salts and bisulfite salts is used as a polymerization initiator, it is preferable that a degree of neutralization of maleic acid is in a range between 5 and 30 mol %, and more preferably in a range between 10 and 25 mol %. When a combination of hydrogen peroxide and polyvalent metal ions is used as a polymerization initiator, a degree of neutralization of maleic acid is arbitrary, but a preferable range is between 10 and 50 mol %. Maleic acid may be neutralized before it is supplied to the reaction vessel, or in the reaction vessel by supplying acids and bases separately.

A mole ratio of used amounts of acrylic acid/acrylate to maleic acid/maleate is preferably 95–80/5–20, and more preferably 90–85/10–15. If a used amount of maleic acid/maleate is below the above-specified range, the calcium ion trapping ability is deteriorated. On the other hand, if a used amount of acrylic acid/acrylate is below the above-specified range, the clay dispersing ability in high hard water is deteriorated.

In the present embodiment, the monomer component may additionally include a monomer in addition to acrylic acid/acrylate and maleic acid/maleate to the extent that the effect of the present invention is not impaired. Any monomer which can copolymerize with acrylic acid/acrylate and maleic acid/maleate is available, examples of which include, but not limited to:

methacrylic acid;

salts of methacrylic acid, which are partially or completely neutralized with alkali metal (monovalent metal), such as sodium and potassium, or alkali earth metal (bivalent metal);

salts of methacrylic acid, which are partially or completely neutralized with ammonia, or organic amines, such as monoethanol amine and triethanol amine;

various kinds of monomers specified as examples of Monomer (II) in Embodiment 1, namely, monoethylenic unsaturated aliphatic monocarboxylic acid, and partially or completely neutralized salts thereof;

monoethylenic unsaturated aliphatic dicarboxylic acids, and partially or completely neutralized salts thereof;

monoethylenic unsaturated monomer having a sulfonic acid group, and partially or completely neutralized salts thereof;

unsaturated hydrocarbons containing a hydroxyl group;
amide monomers;
cationic monomers;
nitrile monomers;
phosphorous-content monomers; etc.

One member or a mixture of two or more of members selected from these example compounds can be used effectively.

In the manufacturing method of the present embodiment, it is necessary to use, as a polymerization initiator, (1) a combination of persulfate salts and bisulfite salts; and/or (2) a combination of hydrogen peroxide and polyvalent metal ions. Persulfate salts, bisulfite salts, hydrogen peroxide, and polyvalent metal ions have been known as the polymerization initiator with other kinds of compounds (azo compounds, organic peroxides, etc). However, the inventors of the present invention confirmed that, a copolymer fulfilling the objects of the present invention, that is, having a clay dispersing ability in high hard water of 50% or greater and a calcium ion trapping ability of 270 mgCaCO$_3$/g or greater can be obtained only when a combination of persulfate salts and bisulfite salts and/or a combination of hydrogen peroxide and polyvalent metal ions are used. The copolymer of the present invention can not be obtained if persulfate salts, bisulfite salts, hydrogen peroxide, and polyvalent metal ions are used independently, combined with other compounds (for example, a combination of air and bisulfite salts), or combined differently (for example, a combination of persulfate salts and hydrogen peroxide). Note that, however, another kind of polymerization initiator can be added to a combination of persulfate salts and bisulfite salts or a combination of hydrogen peroxide and polyvalent metal ions to the extent that the effect of the present invention is not impaired.

The following will explain a case where a combination of persulfate salts and bisulfite salts is used as the polymerization initiator. Sodium persulfate, potassium persulfate, ammonium persulfate, etc. are preferably used as persulfate salts, and one member or a mixture of two or more members selected from these example compounds can be used effectively. Sodium bisulfite, potassium bisulfite, ammonium bisulfite, etc. are preferably used as bisulfite salts, and one member or a mixture of two or more members selected from these example compounds can be used effectively.

A weight ratio of used persulfate salts to bisulfite salts is preferably in a range between 1/0.5 and 1/5, and more preferably, in a range between 1/1 and 1/2. When a used amount of persulfate salts is less than the above-specified range, a molecular weight tends to increase. On the other hand, when a used amount of bisulfite salts is less than the above-specified range, a molecular weight distribution tends to broaden.

A total amount of used persulfate salts and bisulfite salts with respect to 1 mole of a monomer component is preferably in a range between 5 and 15 g, and more preferably in a range between 10 and 15 g. When a total amount is less than the above-specified range, a molecular weight tends to increase and a molecular weight distribution tends to broaden. On the other hand, when a total amount exceeds the above-specified range, in most of the cases, an effect of adding the polymerization initiator is not enhanced in a matching ratio to an increased amount.

It is preferable to drop 80 wt % or more of persulfate salts and bisulfite salts to the reaction vessel, and dropping an entire amount is more preferable. When less than 80 wt % of persulfate salts and bisulfite salts are dropped, in other words, 20 wt % or more of the same are charged as the original charge, persulfate salts and bisulfite salts are not utilized effectively in the polymerization reaction, and a decomposition readily occurs at the initial stage. Also, a dropping time of persulfate salts and bisulfite salts is preferably about 20 minutes shorter or longer, and more preferably up to 10 minutes shorter or longer than a dropping time of the monomer component.

Next, the following will explain a case where a combination of hydrogen peroxide and polyvalent metal ions is used as the polymerization initiator. An amount of used hydrogen peroxide with respect to 1 mole of the monomer component is preferably in a range between 5 and 15 g, and more preferably in a range between 8 and 12 g. When an amount of used hydrogen peroxide is less than the above-specified range, a molecular weight tends to increase and a molecular weight distribution tends to broaden. On the other hand, when an amount of used hydrogen peroxide exceeds the above-specified range, an effect of adding hydrogen peroxide does is not enhanced in a matching ratio to an increased amount.

It is preferable to drop 80 wt % or more of hydrogen peroxide to the reaction vessel, and dropping an entire amount is more preferable. When less than 80 wt % of hydrogen peroxide is dropped, in other words, 20 wt % or more of the same is charged as the original charge, hydrogen peroxide is not utilized effectively in the polymerization reaction, and a decomposition readily occurs at the initial stage. Also, a dropping time of hydrogen peroxide is preferably at least 20 minutes shorter than a dropping time of the monomer component.

One member or a mixture of two or more members selected from iron ions ($Fe^{2+}$, $Fe^{3+}$), vanadium ions ($V^{2+}$, $V^{3+}$, $VO^{2+}$), and copper ions ($Cu^{2+}$) can be used effectively as polyvalent metal ions, and iron ions are particularly preferable. A supplying method of polyvalent metal ions is not especially limited, and metal and/or a metal compound which ionize in the polymerization reaction series can be used. Examples of the metal compound includes:

water-soluble metal salts, such as vanadium oxytrichloride, vanadium trichloride, vanadium oxalate, vanadium sulfate, vanadic anhydride, ammonium vanadate (V), ammonium hypovanadous sulfate (($NH_4$)$_2SO_4 \cdot VSO_4 \cdot 6H_2O$), ammonium vanadous sulfate (($NH_4$)V($SO_4$)$_2 \cdot 12H_2O$), copper (II) acetate, copper (II) bromide, bis(acetylacetonato)copper (II), copper (II) chloride, copper carbonate, copper (II) citrate, copper (II) formate, copper (II) hydroxide, copper (II) oleate, copper maleate, copper phosphate, copper (II) sulfate, iron acetylacetonate, iron ammonium citrate, iron (III) ammonium oxalate trihydrate, iron (II) ammonium sulfate hexahydrate (Mohr's salt), iron (III) ammonium sulfate 12-water, iron citrate, iron fumarate, iron maleate, iron (II) lactate trihydrate, iron (II) nitrate, iron pentacarbonyl, iron (III) phosphate n-hydrate, and iron (II) pyrophosphate;

metal oxides, such as vanadium pentoxide, copper (II) oxide, iron (II) oxide, and iron (III) oxide;

metal sulfides, such as copper (II) sulfide and iron sulfide; etc.

It is preferable to charge 80 wt % or more of polyvalent metal ions, namely the aforementioned metals and/or metal compounds, to the reaction vessel as the original charge, and charging an entire amount as the original charge is more preferable. Also, an amount of used polyvalent metal ions preferably attains a concentration of 5–500 ppm, and more preferably 10–400 ppm with respect to an entire amount of the reaction solution. When an amount of used polyvalent metal ions is less than the above-specified range, a decomposition efficiency of hydrogen peroxide tends to deteriorate. On the other hand, when an amount of used polyvalent metal ions exceeds the above-specified range, the resulting polymer is colored and an effect of adding polyvalent metal ions are hardly attained.

An aqueous solvent is used as a polymerization solvent. An aqueous solvent containing 80 wt % or more of water and 20 wt % or less of an organic solvent is preferable and water is more preferable. A member or a mixture of two or more members selected from: lower alcohols, such as methanol, ethanol, and isopropyl alcohol; amides, such as dimethylformamdie; ethers, such as diethyl ether and dioxane; etc. can be used effectively as the organic solvent used in the aqueous solvent.

In the present embodiment, the monomer component, polymerization initiator, aqueous solvent, and other raw materials used when needed are used in such amounts that a theoretical solid concentration of the resulting polymer is 40 wt % or more. When the theoretical solid concentration is less than 40 wt %, a molecular weight distribution tends to broaden. The theoretical solid concentration can be adjusted by weights of each raw material supplied to the reaction vessel as the original charge or by means of dropping. For example, in case that acrylic acid or maleic acid/maleic anhydride and bases, such as sodium hydroxide, are supplied to the reaction vessel separately to trigger neutralization in the reaction vessel, it must be concerned that such neutralization yields water.

As polymerization conditions, a reaction temperature is preferably 80° C. or higher, and more preferably in the vicinity of a boiling point of the aqueous solvent. A reaction pressure is not especially limited, and the polymerization can take place under normal (ambient) pressure, reduced pressure, or applied pressure. Also, as previously mentioned, when a combination of persulfate salts and bisulfite salts is used as the polymerization initiator, a pH during the polymerization is preferably 5 or smaller, and more preferably 4 or smaller. A pH larger than 5 is not preferable, because a molecular weight increases.

The (acrylic acid/acrylate–maleic acid/maleate) copolymer of the present invention attains a high clay dispersing ability in high hard water and a high calcium ion trapping ability. Naturally, a detergent composition containing such a copolymer and a surfactant exhibits an extremely excellent washing ability. An amount of the copolymer based on a total weight of the detergent composition is preferably in a range between 0.1 and 20 wt %, and more preferably in a range between 0.5 and 15 wt %. An amount of the surfactant based on a total weight of the detergent composition is preferably in a range between 5 and 70 wt %, and more preferably in a range between 20 and 60 wt %.

Any of an anionic surfactant, a nonionic surfactant, an amphoteric surfactant, and a cationic surfactant is available as surfactant used herein. Examples of the anionic surfactant include: alkylbenzene sulfonate, alkyl or alkenyl ether sulfate, alkyl or alkenyl sulfate, α-olefin sulfonate, α-sulfofatty acid or ester salts, alkane sulfonate, saturated or unsaturated salts of fatty acid, alkyl or alkenyl ether carboxylate, amino-acid type surfactant, N-acyl amino-acid type surfactant, alkyl or alkenyl phosphoric ester or salts thereof. Examples of the nonionic surfactant include: polyoxy alkylene alkyl or alkenyl ether, polyoxy ethylene alkylphenyl ether, higher fatty acid alkanolamide or an alkylene oxide adduct thereof, saccharic fatty acid ester, alkyl glycoxide, glycerol fatty acid monoester, and alkylamineoxide. Examples of the amphoteric surfactant include: a carboxy type or sulfobetain type amphoteric surfactant. Examples of the cationic surfactant include quaternary ammonium salts.

The detergent composition of the present invention may additionally include components generally contained in a detergent composition, such as an enzyme, an alkali builder, a chelate builder, a re-adhesion inhibitor, a luminescence agent, a bleaching agent, and a perfume.

By adopting the present embodiment, it has become possible to provide an (acrylic acid/acrylate–maleic acid/maleate) copolymer having a high clay dispersing ability in high hard water and a high calcium ion trapping ability. Hence, the detergent composition using the above copolymer can exhibit an excellent cleaning ability in the United States, China, etc., namely regions where high hard water is supplied.

Besides being used as the detergent composition, the (acrylic acid/acrylate–maleic acid/maleate) copolymer of the present invention can be used as an inorganic pigment dispersant, a water treatment agent, a fiber treatment agent, etc.

EXAMPLES AND COMPARATIVE EXAMPLES

The following will explain in detail a (meth)acrylic acid polymer of Embodiment 1 and an (acrylic acid/acrylate–maleic acid/maleate) copolymer of Embodiment 2 by way of examples and comparative examples for purposes of explanation only, without any intention as a definition of the limits of the invention. In examples and comparative examples below, "%" means "wt %" and "part(s)" means "part(s) by weight".

The physical properties of the (meth)acrylic acid polymer and the (acrylic acid/acrylate–maleic acid/ maleate) copolymer of the present invention, namely, a weight average molecular weight, an anti-gelling ability, an end-terminal sulfonic acid group, a calcium ion trapping ability, and clay dispersing ability in high hard water and low hard water are measured or determined in the following manner.

Weight Average Molecular Weight

Weight average molecular weights (hereinafter, referred to as Mw) of the (meth)acrylic acid polymer and the (acrylic acid/acrylate–maleic acid/maleate) copolymer are measured by means of GPC (Gel Permeation Chromatography). The column of GPC used herein is a column commercially known as GF-7MHQ of Showa Denko, K.K. The moving phase used herein is filtrate obtained by preparing 5,000 g of an aqueous solution by mixing 34.5 g of disodium hydrogenphosphate. 12-hydrate, 46.2 g of sodium dihydrogenphosphate dihydrate, and ion exchange water (hereinafter, referred to as pure water occasionally), and by filtering the aqueous solution with 0.45 μm-membrane filter. Note that each reagent used herein is a guaranteed reagent. Also, each reagent used in measuring a degree of gelling and in each example is a guaranteed reagent. A detector of Model 481 (detection wavelength UV: 214 nm) of Waters is used herein, and a pump commercially known as L-7110 of Hitachi, Ltd. is used herein. A flowing rate of the moving phase is set to 0.5 ml/min., and a flowing temperature is set to 35° C. An analytical curve is drawn by using a standard sample of sodium polyacrylate of Sowa Kagaku.

Anti-gelling Ability

An anti-gelling ability is measured in the following manner. That is, a buffer solution of boric acid, an aqueous solution of calcium chloride, and 1% polymer solution are prepared. To be more specific, the buffer solution of boric acid is prepared by mixing 7.42 g of boric acid, 1.75 g of sodium chloride, 7.63 g of sodium borate decahydrate, and pure water in a total weight of 1,000 g. The aqueous solution of calcium chloride is prepared by mixing 0.735 g of calcium chloride dihydrate with pure water in a total weight of 2,500 g. The 1% polymer solution is prepared by diluting the polymer of the present invention to 1% with pure water.

Then, each solution of a predetermined amount is charged to a tall beaker of 500 ml in a predetermined manner. More specifically, 250 ml of pure water is charged to the beaker, followed by 10 ml of the buffer solution of boric acid, 5 ml of the 1% polymer solution, and 250 ml of the aqueous solution of calcium chloride.

By mixing the above solutions in the above manner, the polymer of the present invention is turned into gel, whereby a sample liquid is prepared. The tall beaker charged with the sample liquid is lidded, and allowed to stand for an hour in a thermostatic bath set at 90° C. After an hour has passed, the sample liquid is placed into a quartz cell of 5 cm across, and a light absorbancy (a) at a UV wavelength of 380 nm is measured.

On the other hand, a blank solution is prepared in the same manner as above except that, of all the four components charged to produce the sample liquid, 250 ml of an aqueous solution of calcium chloride is replaced with 250 ml of pure water. Then, light absorbancy (blank value) (b) of the blank solution at UV wavelength of 380 nm is measured. Then, a degree of gelling is computed using the absorbancy (a) and blank value (b) in accordance with the following equation:

degree of gelling=(a)−(b).

Subsequently, the anti-gelling Q-value is computed using the degree of gelling thus obtained in accordance with the following equation:

Q=degree of gelling×$10^5$/Mw.

End-Terminal Sulfonic Acid Group

An amount of end-terminal sulfonic acid groups is determined in the following manner. Initially, $^1$H-NMR ($D_2O$ solvent) of the (meth)acrylic acid polymer of the present invention obtained in the form of an aqueous solution is measured. Then, a peak (about 2.4 ppm) of methylene hydrogen derived from sulfonic acid groups and a peak (about 3.0 ppm) of a methine hydrogen derived from the sulfonic acid groups are detected, both of which are not observed when, for example, sodium persulfate (NaPS) alone is polymerized.

By computing an integral ratio of these peaks and a total of peaks of methylene hydrogen and methine hydrogen (about 1–2.2 ppm) in the main chain of sodium polyacrylate, an amount of end-terminal sulfonic acid groups of a (meth) acrylic polymer obtained in each example is determined. Note that, in Examples 1 through 6, a mole ratio of charged sodium bisulfite (SBS) to acrylic acid (AA) is set to SBS/AA=1/13.

Calcium Ion Trapping Ability

Initially, a sample aqueous solution of calcium ions (aqueous solution for analytic curve) is prepared in the following manner. Three kinds of aqueous solutions are prepared in 50 ml for each by using calcium chloride-dihydrate, so that 0.01 mol/L, 0.001 mol/L, and 0.0001 mol/L of $Ca^{2+}$ ions are contained respectively. Then, a pH of each is adjusted to 9–11 with an 4.8% aqueous solution of sodium hydroxide, and 1 ml of 4 mol/L aqueous solution of potassium chloride is added to each.

Then, an aqueous solution of a measurement sample is prepared. More specifically, 10 mg of the polymer (pH is adjusted to 7) in solid conversion is weighed on balance in a beaker of 100 ml, to which 50 ml of a 0.001 mol/L aqueous solution of calcium ions adjusted with sodium chloride-dihydrate is added and stirred homogeneously with a stirrer. Then, a pH of the resulting solution is adjusted to 9–11 with a 4.8% aqueous solution of sodium hydroxide, to which 1mf of 4 mol/L aqueous solution of potassium chloride is added.

The measurement is conducted by Calcium Ion Electrode 93–20 of Orion Sha by using Ion Analyzer EA 920 of Orion Sha.

An amount of calcium ions trapped by the measurement sample is found from the analytic curve and the measurement value of the measurement sample (polymer), and a trapping amount per 1 g of solid polymer is converted to mg in $CaCO_3$ conversion, which is used as a calcium ion trapping ability value.

Clay Dispersing Ability in High Hard Water

Initially, 600 g of buffer solution of glycin is prepared by adding ion exchange water to 67.56 g of glycin, 52.6 g of sodium chloride, and 60 ml of 1N-NaOH. Then, 0.3268 g of calcium chloride-dihydrate and 60 g of the glycin buffer solution are weighed on balance, and 1000 g of a dispersing liquid is prepared by adding ion exchange water. On the other hand, a 0.1% aqueous solution (pH is adjusted to 7) of the polymer in solid conversion is prepared.

Then, 0.3 g of clay, namely JIS Test Powder I, kind 8 (Kanto Rohm, fine particles: Nihon Funtai Kogyo Gijutsu Kyokai) is charged in a test tube, to which 27 g of the dispersing liquid and 3 g of the aqueous solution of the polymer are added. Here, a calcium concentration of the test liquid is 200 ppm in $CaCO_3$ conversion.

Then, the test tube is sealed airtight with Parafilm® and shaken gently, so that the clay is homogeneously dispersed therein, after which the test tube is shaken 20 times vertically. The test tube is allowed to stand for 20 hours in a place where no direct sun light is irradiated, and 5 ml of a supernatant of the test liquid is extracted by a whole pipet.

Transmittance (T%) of the extracted supernatant is measured by a UV spectroscope with a cell of 1 cm across at a wavelength of 380 nm. A value (%) found by subtracting transmittance (T%) thus measured from 100 is defined as a clay dispersing ability (turbidity) in high hard water.

Clay Dispersing Ability in Low Hard Water

Transmittance (T%) is measured in the same manner as the measuring method of the clay dispersing ability in high hard water except that, when preparing a dispersing liquid, an added amount of calcium chloride-dihydrate is reduced to 0.0817 g (50 ppm in $CaCO_3$ conversion). A value (%) found by subtracting transmittance (T%) thus measured from 100 is defined as a clay dispersing ability (turbidity) in low hard water.

The following will explain a (meth)acrylic acid polymer of Embodiment 1 by way of Examples 1 through 6.

Example 1

Here, 300 g of pure water is charged as the original charge to a separable flask of SUS equipped with a reflux condenser and a stirrer and having a capacity of 5 l, and heated to a boiling point with stirring. Then, 720 g (8 mole) of a 80% aqueous solution of acrylic acid (hereinafter, referred to as 80% AA), 106.7 g (2 g/mole when converted to a charged amount based on a weight of the monomer) of a 15% aqueous solution of sodium persulfate (hereinafter, referred to as 15% NaPS), 182.9 g (8 g/mole when converted to a charged amount based on a weight of the monomer) of a 35% aqueous solution of sodium bisulfite (hereinafter, referred to as 35% SBS), and 126.5 g of pure water are dropped over 120 minutes through their respective nozzles to a polymerization reaction series in a boiling-point reflux state.

When the dropping ends, the reaction solution is maintained (matured) at the boiling-point reflux state for 30 minutes to complete the polymerization. When the polymerization is completed, the reaction solution is allowed to stand and cooled, after which the reaction solution is neutralized by gradually dropping 600 g (7.2 mole) of a 48% aqueous solution of sodium hydroxide (hereinafter, referred to as 48% NaOH) to the same, whereby an aqueous solution of sodium polyacrylate (1) (hereinafter, referred to as Polymer (1)) having a solid concentration of 40% and a final degree of neutralization of 90% is obtained. The weight average molecular weight Mw, anti-gelling ability Q-value, an amount of end-terminal sulfonic acid groups (actually measured value), calcium ion trapping ability (hereinafter, referred to as Ca trapping ability), and clay dispersing ability of Polymer (1) thus obtained are measured or determined, and set forth in Table 1 below. Also, major reaction conditions are set forth in Table 2 below.

Example 2

A polymerization reaction is conducted in the same manner as Example 1 except that dropping amounts of 80% AA, 15% NaPS, and 35% SBS are increased to 810 g (9 mole) 240 g (4 g/mole when converted to a charged amount based on a weight of the monomer), and 205.7 g (8 g/mole when converted to a charged amount based on a weight of the monomer), and a dropping amount of pure water is reduced to 104.8 g. Then, the reaction solution is neutralized by dropping 675 g (8.1 mole) of 48% NaOH, whereby an aqueous solution of sodium polyacrylate (2) (hereinafter, referred to as Polymer (2)) having a solid concentration of 40% and a final degree of neutralization of 90% is obtained.

The physical properties of Polymer (2) thus obtained are measured or determined in the same manner as Example 1, and set forth in Table 1 below. Also, major reaction conditions are set forth in Table 2 below.

Example 3

A polymerization reaction is conducted in the same manner as Example 2 except that a dropping amount of 15% NaPS is increased to 360.0 g (6 g/mole when converted to a charged amount based on a weight of the monomer), and a dropping amount of pure water is reduced to 29.8 g. Then, the reaction solution is neutralized by dropping 48% NaOH in the same amount as in Example 2 (675 g, or 8.1 mole), whereby an aqueous solution of sodium polyacrylate (3) (hereinafter, referred to as Polymer (3)) having a solid concentration of 40% and a final degree of neutralization of 90% is obtained.

The physical properties of Polymer (3) thus obtained are measured or determined in the same manner as Example 1, and set forth in Table 1 below. Also, major reaction conditions are set forth in Table 2 below.

Example 4

A polymerization reaction is conducted in the same manner as Example 2 except that an original charge amount of pure water is reduced to 200 g, a dropping amount of 15% NaPS is increased to 480 g (8 g/mole when converted to a charged amount based on a weight of the monomer) and a dropping amount of pure water is reduced to 54.8 g. Then, the reaction solution is neutralized by dropping 48% NaOH in the same amount as in Example 2 (675 g, or 8.1 mole), whereby an aqueous solution of sodium polyacrylate (4) (hereinafter, referred to as Polymer (4)) having a solid concentration of 40% and a final degree of neutralization of 90% is obtained.

The physical properties of Polymer (4) thus obtained are measured or determined in the same manner as Example 1, and set forth in Table 1 below. Also, major reaction conditions are set forth in Table 2 below.

Example 5

A polymerization reaction is conducted in the same manner as Example 1 except that an original charge amount of pure water is reduced to 150 g, dropping amounts of 80% AA, 15% NaPS, and 35% SBS are increased to 900 g (10 mole), 266.7 g (4/g mole when converted to a charged amount based on a weight of the monomer), and 228.6 g (8 g/mole when converted to a charged amount based on a weight of the monomer), respectively, and a dropping amount of pure water is reduced to 11.4 g. Then, the reaction solution is neutralized by dropping 750 g (9 mole) of 48% NaOH to the same, whereby an aqueous solution of sodium polyacrylate (5) (hereinafter, referred to as Polymer (5)) having a solid concentration of 45% and a final degree of neutralization of 90% is obtained.

The physical properties of Polymer (5) thus obtained are measured or determined in the same manner as Example 1, and set forth in Table 1 below. Also, major reaction conditions are set forth in Table 2 below.

Example 6

A polymerization reaction is conducted in the same manner as Example 1 except that an original charge amount of pure water is increased to 450 g, 602 g (7 mole) of 100% methacrylic acid (hereinafter, referred to as 100% MAA) is dropped instead of 80% AA, a dropping amount of 15% NaPS is increased to 186.7 g (4 g/mole when converted to a charged amount based on a weight of the monomer), a dropping amount of 35% SBS is reduced to 16.0 g (8 g/mole when converted to a charged amount based on a weight of the monomer), and a dropping amount of pure water is increased to 137.8 g. Then, the reaction solution is neutralized by dropping 525 g (6.3 mole) of 48% NaOH to the same, whereby an aqueous solution of sodium polyacrylate (6) (hereinafter, referred to as Polymer (6)) having a solid concentration of 40% and a final degree of neutralization of 90% is obtained.

The physical properties of Polymer (6) thus obtained are measured or determined in the same manner as Example 1, and set forth in Table 1 below. Also, major reaction conditions are set forth in Table 2 below.

The following description will explain Comparative Examples 1 through 4 versus Examples 1 through 6. To be more specific, Comparative Example 1 is conducted to explain an effect of adding bisulfite salts in the present invention; Comparative Example 2 is conducted to explain an effect of polymerizing a monomer under acid conditions; Comparative Example 3 is conducted to explain an effect of introducing end-terminal sulfonic acid groups; and Comparative Example 4 is conducted to explain an adverse effect of introducing a hydrophobic monomer.

Comparative Example 1

A polymerization reaction is conducted in the same manner as Example 1 except that dropping amounts of 80% AA, 15% NaPS, and pure water are increased to 810 g (9 mole), 240 g (4 g/mole when converted to a charged amount based on a weight of the monomer), and 130.5 g, respectively, while omitting 35% SBS. Then, the reaction solution is neutralized by dropping 675 g (8.1 mole) of 48% NaOH to the same, whereby an aqueous solution of comparative sodium polyacrylate (1) (hereinafter, referred to as Comparative Polymer (1)) having a solid concentration of 40% and a final degree of neutralization of 90% is obtained.

The physical properties of Comparative Polymer (1) thus obtained are measured or determined in the same manner as Example 1, and set forth in Table 1 below.

Comparative Example 2

A polymerization reaction is conducted in the same manner as Example 1 except that 48% NaOH of the same amount, which is added during the neutralization step in Example 1, is dropped together with 80% AA, 15% NaPS, 35% SBS, and pure water. Hence, a dropping amount of 48% NaOH is the same as the dropping amount in Example 1. In this manner, not by the polymerization under acid conditions, but by the polymerization of a neutralization type (salt type), an aqueous solution of comparative sodium polyacrylate (2) (hereinafter, referred to as Comparative Polymer (2)) having a solid concentration of 40% and a final degree of neutralization of 90% is obtained.

The physical properties of Comparative Polymer (2) thus obtained are measured or determined in the same manner as Example 1, and set forth in Table 1 below.

Comparative Example 3

Different from Examples 1 through 6 and Comparative Examples 1 and 2, a polymerization of a neutralized type like the one in Comparative Example 2 is conducted by a conventionally known method, namely, by using 2 g/mole of NaPS with a solid concentration of 20%, whereby an aqueous solution of comparative sodium polyacrylate (3) (hereinafter, referred to as Comparative Polymer (3)) is obtained. Hence, a sulfonic acid is not introduced to an end terminal of Comparative Polymer (3) thus obtained.

The physical properties of Comparative Polymer (3) thus obtained are measured or determined in the same manner as Example 1, and set forth in Table 1 below.

Comparative Example 4

A polymerization reaction is conducted in the same manner as Example 1 except that 200 g of pure water and 233.7 g of isopropyl alcohol are charged as the original charge, and besides 80% AA, 94.4 g of phenoxy polyethylene glycol acrylate (molecular weight Mw=236) is dropped as a hydrophobic monomer. Also, dropping amounts of 15% NaPS and 35% SBS are increased to 224.6 g (4 g/mole when converted to a charged amount based on a weight of the monomer) and 192.5 g (8 g/mole when converted to a charged amount based on a weight of the monomer), respectively, and a dropping amount of pure water is reduced to 66.9 g. In short, the monomer used in Example 1 is copolymerized with about 5 mol % of the hydrophobic monomer. Then, the reaction solution is neutralized by dropping 600 g (7.2 mole) of 48% NaOH to the same, whereby a solution of a comparative (sodium acrylate–phenoxy polyethylene glycol acrylate) copolymer (4) (hereinafter, referred to as Comparative Polymer (4)) having a solid concentration of 40% and a final degree of neutralization of 90% is obtained.

The reason why 233.7 g of isopropyl alcohol is charged as the original charge with pure water is that, if a polymerization solvent is composed of pure water alone, the reaction solution is not made into a homogenous series when dropping phenoxy polyethylene glycol acrylate used as the hydrophobic monomer.

Isopropyl alcohol is distilled out from the solution of Comparative Polymer (4) thus obtained by an evaporator, and the solution is adjusted again to be an aqueous solution having a solid concentration of 40%, whereby an aqueous solution of Comparative Polymer (4) is obtained.

The physical properties of Comparative Polymer (4) thus obtained are measured or determined in the same manner as Example 1, and set forth in Table 1 below.

TABLE 1

|  | SOLID (%) | WEIGHT AVERAGE MOLECULAR WEIGHT (Mw) | ANTI-GELLING ABILITY (Q) | END-TERMINAL SULFONIC ACID GROUP (SBS/AA) | | Ca TRAPPING ABILITY (mgCaCO$_3$/g) | CLAY DISPERSING ABILITY (TURBIDITY %) | |
|---|---|---|---|---|---|---|---|---|
|  |  |  |  | CHARGE RATIO (MOLE RATIO) | ACTUAL VALUE (MOLE RATIO) |  | HIGH HARD WATER | LOW HARD WATER |
| POLYMER (1) | 40 | 8700 | 1.09 | 1/13 | 1/13.8 | 250 | 61 | 87 |
| POLYMER (2) | 40 | 7200 | 1.32 | 1/13 | 1/16.7 | 250 | 65 | 94 |
| POLYMER (3) | 40 | 5900 | 0.85 | 1/13 | 1/10.7 | 245 | 71 | 97 |
| POLYMER (4) | 40 | 4000 | 1.68 | 1/13 | 1/14.7 | 240 | 70 | 96 |
| POLYMER (5) | 45 | 7200 | 1.51 | 1/13 | 1/16.7 | 250 | 60 | 85 |
| POLYMER (6) | 40 | 4600 | 1.24 | 1/13 | 1/17.1 | 210 | 62 | 88 |
| COMPARATIVE POLYMER (1) | 40 | 45000 | 3.11 | — | — | 305 | 13 | 35 |
| COMPARATIVE POLYMER (2) | 40 | 63000 | 4.24 | — | — | 310 | 11 | 28 |
| COMPARATIVE POLYMER (3) | — | 5000 | 3.92 | — | — | 240 | 60 | 91 |
| COMPARATIVE POLYMER (4) | 40 | 9000 | 2.54 | — | — | 180 | 35 | 67 |

TABLE 2

| | | ORIGINAL CHARGE PURE WATER (g) | DROPPING AMOUNT | | | | | NEUTRAL-IZATION |
| | | | 80% AA (g) (mole) | 100% MAA (g) (mole) | 15% NaPS (g) (g/mole) | 35% SBS (g) (g/mole) | PURE WATER (g) | 48% NaOH (g) (mole) |
|---|---|---|---|---|---|---|---|---|
| EXAMPLE | 1 | 300 | 720 / 8 | — / — | 106.7 / 2 | 182.9 / 8 | 126.5 | 600 / 7.2 |
| | 2 | 300 | 810 / 9 | — / — | 240.0 / 4 | 205.7 / 8 | 104.8 | 675 / 8.1 |
| | 3 | 300 | 810 / 9 | — / — | 360.0 / 6 | 205.7 / 8 | 29.8 | 675 / 8.1 |
| | 4 | 200 | 810 / 9 | — / — | 480.0 / 8 | 205.7 / 8 | — | 675 / 8.1 |
| | 5 | 150 | 900 / 10 | — / — | 266.7 / 4 | 228.6 / 8 | 11.4 | 750 / 9.0 |
| | 6 | 450 | — / — | 602 / 7 | 186.7 / 4 | 160.0 / 8 | 137.8 | 525 / 6.3 |

80% AA: 80% AQUEOUS SOLUTION OF ACRYLIC ACID
100% MAA: METHACRYLIC ACID
15% NaPS: 15% AQUEOUS SOLUTION OF SODIUM PERSULFATE
35% SBS: 35% AQUEOUS SOLUTION OF SODIUM BISULFITE
48% NaOH: 48% AQUEOUS SOLUTION OF SODIUM HYDROXIDE

Table 1 reveals that each of Polymers (1) through (6) of the present invention has a molecular average molecular weight (Mw) of 9,000 or smaller. Hence, it is understood that a low-molecular-weight polymer can be obtained in a satisfactory manner in one phase under a high-concentration condition. Also, each of Polymers (1) through (6) of the present invention has an anti-gelling ability Q-value of 2.0 or smaller, and therefore it is understood that each has a very satisfactory anti-gelling ability. on the other hand, Comparative Polymer (1), obtained from a polymerization reaction series to which bisulfite salts are not added, has Mw of 45,000 and can not be classified as a low-molecular-weight polymer. Also, Comparative Polymer (1) has an anti-gelling ability Q-value of 3.11, and, by being adversely affected with its increased molecular weight, exhibits very poor resistance to gelling. Comparative Polymer (2), which has not undergone a polymerization reaction under acid conditions, has Mw of as large as 63,000. Therefore, even when compared with Polymer (1) and Comparative Polymer (1), Mw of Comparative Polymer (2) is increased markedly. In addition, Comparative Polymer (2) has an anti-gelling ability Q-value of 4.24, and exhibits very poor resistance to gelling.

From the foregoing, in order to obtain a (meth)acrylic acid polymer having both a low molecular weight and high resistance to gelling, it is important to use bisulfite salts in the initiator series and polymerize the monomer under acid conditions.

Comparative Polymer (3), obtained under the conditions where a sulfonic acid group is not introduced to an end terminal, has Mw of 5,000, and is a low-molecular-weight polymer similar to Polymers (1) through (6), but its anti-gelling ability Q-value is increased to 3.92. This proves that, if a sulfonic acid group is not introduced to an end terminal of the polymer, the polymer attains poor resistance to gelling whether it has a low molecular weight or not.

Further, Comparative Polymer (4), obtained by additionally adding a hydrophobic monomer, has Mw of 9,000, and is defined as a low-molecular-weight polymer, but its anti-gelling ability Q-value is 2.54. This reveals that, when a hydrophobic monomer is introduced, a low-molecular-weight polymer can be obtained at high concentration, but the resulting polymer has poor resistance to gelling.

As has been discussed, a manufacturing method of the (meth) acrylic acid polymer of the present invention is a method of polymerizing 60 mol % or more of a hydrophilic monomer containing 50 mol % or more of (meth)acrylic acid under acid conditions where a pH is smaller than 5 with a combination of at least one kind of persulfate salts and at least one kind of bisulfite salts used as the initiator series in such a manner that a resulting polymer has a solid concentration of 40% or higher. The (meth)acrylic acid polymer of the present invention obtained by the above method has a weight average molecular weight ranging from 3,000 to 15,000, a sulfonic acid group at an end terminal, and an anti-gelling ability Q-value of smaller than 2.0.

Consequently, the (meth)acryic acid polymer of the present invention is a low-molecular-weight polymer which has not only satisfactory dispersing ability and chelating ability due to a sulfonic acid group at an end terminal, but also high resistance to gelling. Hence, the polymer can be suitably used as an inorganic pigment dispersant, a scaling inhibitor, a detergent builder, etc.

The following will explain an (acrylic acid/acrylate–maleic acid/maleate) copolymer of Embodiment 2 by way of Examples 7 through 22.

Example 7

Here, 150 g of ion exchange water and 98 g of maleic anhydride are charged to a separable flask of SUS equipped with a reflux condenser and a stirrer and a capacity of 5 l, and 83.3 g of a 48% aqueous solution of sodium hydroxide is added thereto. Then, the reaction solution is heated to a boiling point with stirring, after which 810 g of a 80% aqueous solution of acrylic acid, 266.7 g of a 15% aqueous solution of sodium persulfate, 228.6 g of a 35% aqueous solution of sodium bisulfite, and 46.8 g of ion exchange water are added to the same through their respective dropping nozzles. The 80% aqueous solution of acrylic acid is dropped over 180 minutes, and the rest are dropped over 190 minutes.

When the dropping ends, the reaction solution is maintained for 20 minuets at a boiling-point reflux state to complete the polymerization. When the polymerization is completed, the reaction solution is allowed to stand and cooled, after which the reaction solution is neutralized by gradually dropping 750 g of a 48% aqueous solution of sodium hydroxide, whereby an (acrylic acid–maleic acid) copolymer having a solid concentration of 48% and a final degree of neutralization of 91% is obtained. The physical properties of the copolymer thus obtained are measured or determined in the above-specified manners and set forth in Table 6. Also, major reaction conditions are set forth in Table 3 below.

Examples 8 through 14

Polymerization reactions are conducted in the same manner as Example 7 except that original charge amounts, dropping amounts, dropping times, post-neutralization amounts are changed as set forth in Table 3. The physical properties of copolymers thus obtained are measured or determined in the above-specified manners and set forth in Table 6.

Example 15

Like in Example 7, 495 g of pure water, 98 g of maleic anhydride, 0.5 g of iron (II) ammonium sulfate hexahydrate (Mohr's salt) are charged to a separable flask of SUS equipped with a reflux condenser and a stirrer and having a capacity of 5 l, and further, 41.7 g of a 48% aqueous solution of sodium hydroxide is added. Then, the reaction solution is heated to a boiling point with stirring, after which 810 g of a 80% aqueous solution of acrylic acid, 285.7 g of a 35% aqueous solution of hydrogen peroxide are dropped to the same through their respective dropping nozzles over 180 minutes and 120 minutes, respectively.

When the dropping ends, the reaction solution is maintained for 20 minuets at a boiling-point reflux state to complete the polymerization, whereby an (acrylic acid–maleic acid) copolymer having a solid concentration of 42% and a final degree of neutralization of 5% is obtained.

After a pH of the copolymer thus obtained is adjusted to 7, the physical properties of the copolymer thus obtained are measured or determined in the above-specified manners and set forth in Table 6. Also, major reaction conditions are set forth in Table 4 below.

Examples 16 through 22

Polymerization reactions are conducted in the same manner as Example 15 except that original charge amounts, dropping amounts, dropping times, post-neutralization amounts are changed as set forth in Table 4. The physical properties of copolymers thus obtained are measured or determined in the above-specified manners and set forth in Table 6.

The copolymers obtained in Examples 16 through 22 have a very low anti-gelling ability and a large quantity of precipitates are yielded. For this reason, an anti-gelling ability Q-value of each can not be measured.

Next, the following description will explain Comparative Examples 5 through 18 versus Examples 7 through 22.

Comparative Example 5

Like in Example 7, 630 g of ion exchange water is charged to a separable flask of SUS equipped with a reflux condenser and a stirrer and having a capacity of 5 l, and a temperature of the ion exchange water is maintained at 25° C. with stirring. Then, while 51 l of air (when converted in a standard state with respect to 1 mole of sodium sulfite) is being blown into the reaction solution, 1430 g of a 35% aqueous solution of sodium acrylate and 276.5 g of a 20% aqueous solution of sodium hydrogen sulfite are dropped to the reaction solution through their respective dropping nozzles over 240 minutes. The reaction solution is maintained at 22–27° C. during the polymerization reaction, and when the dropping ends, air is kept blown into the same for 30 minutes while maintaining the temperature to complete the polymerization, whereby a polyacrylic acid polymer of a completely neutralized type having a solid concentration of 25% is obtained.

The physical properties of the polymer thus obtained are measured or determined in the above-specified manners and set forth in Table 7.

Comparative Example 6

Like in Example 7, 700 g of pure water is charged to a separable flask of SUS equipped with a reflux condenser and a stirrer and having a capacity of 5 l, and heated to a boiling point with stirring. Then, 2032 g of a 37% aqueous solution of sodium acrylate, 106.7 g of a 15% aqueous solution of sodium persulfate, and 1000 g of ion exchange water are dropped to the reaction solution through their respective dropping nozzles over 240 minutes. When the dropping ends, the reaction solution is maintained for 20 minuets at a boiling-point reflux state to complete the polymerization, whereby a polyacrylic acid polymer of a completely neutralized type having a solid concentration of 20% is obtained.

The physical properties of the polymer thus obtained are measured or determined in the above-specified manners and set forth in Table 7. Also, major reaction conditions are set forth in Table 5 below.

Comparative Example 7

Like in Example 7, 375.3 g of pure water and 98 g of maleic anhydride are charged to a separable flask of SUS equipped with a ref lux condenser and a stirrer and having a capacity of 5 l, and further 166.7 g of a 48% aqueous solution of sodium hydroxide is added. Then, the reaction solution is heated to a boiling temperature with stirring, after which 810 g of a 80% aqueous solution of acrylic acid, 266.7 g of a 15% aqueous solution of sodium persulfate, and 1100 g of ion exchange water are dropped to the same through their respective dropping nozzles. The 80% aqueous solution of acrylic acid is dropped over 180 minutes, and the rest are dropped over 190 minutes.

When the dropping ends, the reaction solution is maintained for 20 minuets at a boiling-point reflux state to complete the polymerization. When the polymerization is completed, the reaction solution is allowed to stand and cooled, after which the reaction solution is neutralized by gradually dropping 658.3 g of a 48% aqueous solution of sodium hydroxide, whereby an (acrylic acid–maleic acid) copolymer having a solid concentration of 30% and a final degree of neutralization of 90% is obtained.

The physical properties of the copolymer thus obtained are measured or determined in the above-specified manners and set forth in Table 7. Also, major reaction conditions are set forth in Table 5 below.

Comparative Examples 8 through 10

Polymerization reactions are conducted in the same manner as Comparative Example 7 except that original charge amounts, dropping amounts, dropping times, post-neutralization amounts are changed as set forth in Table 5 below. The physical properties of copolymers thus obtained are measured or determined in the above-specified manners and set forth in Table 7.

Comparative Examples 11 through 18

Copolymers are obtained by conducting polymerization reactions in accordance with conventional manufacturing methods, namely, Examples 1-1, 1-4, 1-6, 1-12, 1-13, 1-16, 1-20, and 1-22 of Japanese Patent No. 2574144. The physical properties of copolymers thus obtained are measured or determined in the above-specified manners and set forth in Table 7.

The copolymers obtained in Comparative Examples 7 through 18 have a very low anti-gelling ability and a large quantity of precipitates are yielded. For this reason, an anti-gelling ability Q-value of each can not be measured.

TABLE 3

| EXAMPLE | | | 7 | 8 | 9 | 10 | 11 | 12 | 13 | 14 |
|---|---|---|---|---|---|---|---|---|---|---|
| ORIGINAL CHARGE | ION EXCHANGE WATER | (g) | 150 | 150 | 170 | 427 | 150 | 640 | 736.7 | 736.7 |
| | MALEIC ANHYDRIDE | (g) | 98 | 98 | 98 | 98 | 147 | 147 | 196 | 196 |
| | | (mole) | 1 | 1 | 1 | 1 | 1.5 | 1.5 | 2 | 2 |
| | 48% NaOH aq | (g) | 83.3 | 41.7 | 20.8 | 41.7 | 62.5 | 62.5 | 83.3 | 83.3 |
| | | (mole) | 1 | 0.5 | 0.25 | 0.5 | 0.75 | 0.75 | 1 | 1 |
| INITIAL DEGREE OF NEUTRALIZATION (%) | | | 50 | 25 | 12.5 | 25 | 25 | 25 | 25 | 25 |
| DROPPING | 80% AA aq | (g) | 810 | 810 | 810 | 810 | 765 | 765 | 720 | 720 |
| | | (mole) | 9 | 9 | 9 | 9 | 8.5 | 8.5 | 8 | 8 |
| | 15% NaPS aq | (g) | 266.7 | 266.7 | 266.7 | 266.7 | 400.0 | 266.7 | 266.7 | 400.0 |
| | | (g/mole) | 4 | 4 | 4 | 4 | 6 | 4 | 4 | 6 |
| | 35% SBS aq | (g) | 228.6 | 228.6 | 228.6 | 228.6 | 228.6 | 228.6 | 228.6 | 228.6 |
| | | (g/mole) | 8 | 8 | 8 | 8 | 8 | 8 | 8 | 8 |
| | ION EXCHANGE WATER | (g) | 46.8 | 46.8 | 46.8 | 89.0 | 102.9 | 0.0 | 0.0 | 0.0 |
| DROPPING TIME | 80% AA aq | (min.) | 0~180 | 0~180 | 0~180 | 0~180 | 0~180 | 0~180 | 0~180 | 0~180 |
| | 15% NaPS aq | (min.) | 0~190 | 0~190 | 0~190 | 0~190 | 0~190 | 0~190 | 0~190 | 0~190 |
| | 35% SBS aq | (min.) | 0~190 | 0~190 | 0~190 | 0~190 | 0~190 | 0~190 | 0~190 | 0~190 |
| | ION EXCHANGE WATER | (min.) | 0~190 | 0~190 | 0~190 | 0~190 | 0~190 | — | — | — |
| POST-NEUTRALIZATION | 48% NaOH aq | (g) | 750.0 | 791.7 | 812.5 | 300.0 | 791.7 | 300.0 | 316.7 | 316.7 |
| | | (mole) | 9 | 9.5 | 9.75 | 3.6 | 9.5 | 3.6 | 3.8 | 3.8 |
| FINAL DEGREE OF NEUTRALIZATION (%) | | | 91 | 91 | 91 | 37.3 | 89 | 38 | 40 | 40 |

48% NaOH aq: 48% AQUEOUS SOLUTION OF SODIUM HYDROXIDE
80% AA aq: 80% AQUEOUS SOLUTION OF ACRYLIC ACID
15% NaPS aq: 15% AQUEOUS SOLUTION OF SODIUM PERSULFATE
35% SBS aq: 35% AQUEOUS SOLUTION OF SODIUM BISULFITE

TABLE 4

| EXAMPLE | | | 15 | 16 | 17 | 18 | 19 | 20 | 21 | 22 |
|---|---|---|---|---|---|---|---|---|---|---|
| ORIGINAL CHARGE | ION EXCHANGE WATER | (g) | 495 | 500 | 463 | 495 | 763 | 656.4 | 656.4 | 736.7 |
| | MALEIC ANHYDRIDE | (g) | 98 | 98 | 98 | 98 | 147 | 147 | 147 | 196 |
| | | (mole) | 1 | 1 | 1 | 1 | 1.5 | 1.5 | 1.5 | 2 |
| | MOHR'S SALT | (g) | 0.5 | 0.05 | 0.5 | 0.1 | 0.05 | 0.5 | 0.3 | 0.5 |
| | (IRON ION CONCENTRATION ppm) | | 40 | 4 | 40 | 8 | 4 | 40 | 24 | 40 |
| | 48% NaOH aq | (g) | 41.7 | 83.3 | 166.7 | 41.7 | 125 | 62.5 | 62.5 | 83.3 |
| | | (mole) | 0.5 | 1 | 2 | 0.5 | 1.5 | 0.75 | 0.75 | 1 |
| INITIAL DEGREE OF NEUTRALIZATION (%) | | | 25 | 50 | 100 | 25 | 50 | 25 | 25 | 25 |
| DROPPING | 80% AA aq | (g) | 810 | 810 | 810 | 810 | 765 | 765 | 765 | 720 |
| | | (mole) | 9 | 9 | 9 | 9 | 8.5 | 8.5 | 8.5 | 8 |
| | 35% $H_2O_2$ aq | (g) | 285.7 | 285.7 | 285.7 | 285.7 | 285.7 | 285.7 | 285.7 | 285.7 |
| | | (g/mole) | 10 | 10 | 10 | 10 | 10 | 10 | 10 | 10 |
| | ION EXCHANGE WATER | (g) | 0 | 0 | 0 | 0 | 0 | 0 | 0 | 0 |
| DROPPING TIME | 80% AA aq | (min.) | 0~180 | 0~180 | 0~120 | 0~180 | 0~180 | 0~180 | 0~180 | 0~180 |
| | 35% $H_2O_2$ aq | (min.) | 0~120 | 0~120 | 0~60 | 0~90 | 0~90 | 0~120 | 0~120 | 0~120 |
| | ION EXCHANGE WATER | (min.) | — | — | — | — | — | — | — | — |
| POST-NEUTRALIZATION | 48% NaOH aq | (g) | 0 | 0 | 0 | 0 | 0 | 0 | 0 | 0 |
| | | (mole) | 0 | 0 | 0 | 0 | 0 | 0 | 0 | 0 |
| FINAL DEGREE OF NEUTRALIZATION (%) | | | 5 | 9 | 18 | 5 | 13 | 6.5 | 6.5 | 8.3 |

MOHR'S SALT; IRON (II) AMMONIUM SULFATE HEXAHYDRATE
48% NaOH aq: 48% AQUEOUS SOLUTION OF SODIUM HYDROXIDE
80% AA aq: 80% AQUEOUS SOLUTION OF ACRYLIC ACID
35% $H_2O_2$ aq: 35% AQUEOUS SOLUTION OF HYDROGEN PEROXIDE

TABLE 5

| COMPARATIVE EXAMPLE | | | 6 | 7 | 8 | 9 | 10 |
|---|---|---|---|---|---|---|---|
| ORIGINAL CHARGE | ION EXCHANGE WATER | (g) | 700 | 375.3 | 750.7 | 1112 | 806 |
| | MALEIC ANHYDRIDE | (g) | — | 98 | 196 | 294 | 294 |
| | | (mole) | — | 1 | 2 | 3 | 3 |
| | 48% NaOH aq | (g) | — | 166.7 | 333.3 | 250 | 500 |
| | | (mole) | — | 2 | 4 | 3 | 6 |
| INITIAL DEGREE OF NEUTRALIZATION (%) | | | — | 100 | 100 | 50 | 100 |
| DROPPING | 80% AA aq | (g) | — | 810 | 720 | 630 | 630 |
| | | (mole) | — | 9 | 8 | 7 | 7 |
| | 37% SA aq | (g) | 2032 | — | — | — | — |
| | | (mole) | 8 | — | — | — | — |
| | 15% NaPS aq | (g) | 106.7 | 266.7 | — | 400 | — |
| | | (g/mole) | 2 | 4 | — | 6 | — |
| | 35% H$_2$O$_2$ aq | (g) | — | — | 428.6 | — | 228.6 |
| | | (g/mole) | — | — | 15 | — | 8 |
| | ION EXCHANGE WATER | (g) | 1000 | 1100 | 131.4 | 44 | — |
| DROPPING TIME | 80% AA aq | (min.) | — | 0~180 | 0~180 | 0~180 | 0~180 |
| | 37% SA aq | (min.) | 0~240 | — | — | — | — |
| | 15% NaPS aq | (min.) | 0~240 | 0~190 | — | 0~190 | — |
| | 35% H$_2$O$_2$ aq | (min.) | — | — | 0~180 | — | 0~190 |
| | ION EXCHANGE WATER | (min.) | 0~240 | 0~190 | 0~180 | 0~190 | — |
| POST-NEUTRALIZATION | 48% NaOH aq | (g) | — | 658.3 | — | 725 | 475 |
| | | (mole) | — | 7.9 | — | 8.7 | 5.7 |
| FINAL DEGREE OF NEUTRALIZATION (%) | | | 100 | 90 | 33.3 | 90 | 90 |

48% NaOH aq: 48% AQUEOUS SOLUTION OF SODIUM HYDROXIDE
80% AA aq: 80% AQUEOUS SOLUTION OF ACRYLIC ACID
37% SA aq: 37% AQUEOUS SOLUTION OF SODIUM ACRYLATE
15% NaPS aq: 15% AQUEOUS SOLUTION OF SODIUM PERSULFATE
35% H$_2$O$_2$ aq: 35% AQUEOUS SOLUTION OF HYDROGEN PEROXIDE

TABLE 6

| | | SOLID (%) | INITIATOR SERIES | AA/MA (MOLE RATIO) | WEIGHT AVERAGE MOLECULAR WEIGHT (Mw) | MA × Mw | ANTI-GELLING ABILITY (Q) | Ca TRAPPING ABILITY (mgCaCO$_3$/g) | CLAY DISPERSING ABILITY (TURBIDITY %) | |
|---|---|---|---|---|---|---|---|---|---|---|
| | | | | | | | | | HIGH HARD WATER | LOW HARD WATER |
| EX-AM-PLE | 7 | 48 | NaPS/SBS | 90/10 | 13000 | 130,000 | 2.54 | 280 | 57 | 86 |
| | 8 | 47 | NaPS/SBS | 90/10 | 10000 | 100,000 | 1.86 | 275 | 61 | 88 |
| | 9 | 46 | NaPS/SBS | 90/10 | 15000 | 150,000 | 2.82 | 280 | 53 | 81 |
| | 10 | 43 | NaPS/SBS | 90/10 | 7000 | 70,000 | 1.64 | 270 | 64 | 89 |
| | 11 | 42 | NaPS/SBS | 85/15 | 10000 | 150,000 | 1.92 | 290 | 52 | 80 |
| | 12 | 42 | NaPS/SBS | 85/15 | 7000 | 105,000 | 1.75 | 275 | 58 | 88 |
| | 13 | 41 | NaPS/SBS | 80/20 | 7000 | 140,000 | 2.68 | 280 | 52 | 87 |
| | 14 | 40 | NaPS/SBS | 80/20 | 5000 | 100,000 | 2.31 | 275 | 56 | 89 |
| | 15 | 42 | H$_2$O$_2$/MOHR'S SALT | 90/10 | 5000 | 50,000 | 1.73 | 270 | 67 | 92 |
| | 16 | 41 | H$_2$O$_2$/MOHR'S SALT | 90/10 | 14000 | 140,000 | — | 285 | 51 | 78 |
| | 17 | 42 | H$_2$O$_2$/MOHR'S SALT | 90/10 | 10000 | 100,000 | — | 280 | 53 | 82 |
| | 18 | 41 | H$_2$O$_2$/MOHR'S SALT | 90/10 | 11000 | 110,000 | — | 280 | 53 | 81 |
| | 19 | 41 | H$_2$O$_2$/MOHR'S SALT | 85/15 | 10000 | 150,000 | — | 300 | 52 | 84 |
| | 20 | 43 | H$_2$O$_2$/MOHR'S SALT | 85/15 | 5000 | 75,000 | — | 280 | 59 | 86 |
| | 21 | 43 | H$_2$O$_2$/MOHR'S SALT | 85/15 | 7000 | 105,000 | — | 285 | 58 | 85 |
| | 22 | 42 | H$_2$O$_2$/MOHR'S SALT | 80/20 | 5000 | 100,000 | — | 275 | 55 | 88 |

AA: ACRYLIC ACID
MA: MALEIC ANHYDRIDE
NaPS: SODIUM PERSULFATE
SBS: SODIUM BISULFITE
H$_2$O$_2$: HYDROGEN PEROXIDE
MOHR'S SALT: IRON (II) AMMONIUM SULFATE HEXAHYDRATE

Table 6 reveals that each copolymer obtained by the manufacturing method of the present invention exhibits excellent properties with a clay dispersing ability in high hard water of 50% or greater and a calcium ion trapping ability of 270 mgCaCO$_3$/g or greater. In Examples 7 through 14, a combination of sodium persulfate and sodium bisulfite is used as the polymerization initiator, and in Examples 15 through 22, a combination of hydrogen peroxide and iron ions (Fe$^{2+}$) is used as the polymerization initiator.

In Comparative Examples 5 and 6, maleic acid/maleate is not copolymerized, and a combination of particular compositions is not used as the polymerization initiator. For this reason, the resulting polymers have a high clay dispersing ability in high hard water but a low calcium ion trapping ability.

In Comparable Examples 7 through 10, a combination of particular compositions is not used as the polymerization initiator, and a product (MA×Mw) of a ratio (mol %) (MA) of maleic acid/maleate units in the copolymer and a weight average molecular weight (Mw) of the copolymer exceeds 150,000. For this reason, the resulting copolymers have a high calcium ion trapping ability but a low clay dispersing ability in high hard water. A polymerization concentration is increased in order of Comparative Examples 7, 8, 9 and 10, and so is the product (MA×Mw) of the copolymers, while the clay dispersing ability in high hard water is deteriorated.

In Comparative Examples 11 through 18, a ratio of maleic acid/maleate is high and a combination of particular compositions is not used as the polymerization initiator. For this reason, the resulting copolymers have a high calcium ion trapping ability but a low clay dispersing ability in high hard water.

Hence, the clay dispersing abilities of the copolymers of Examples 7 through 22 and the copolymers of Comparative Examples 5 through 18 do not show a difference when compared with use in low hard water, but show a significant difference when compared with use in high hard water.

Note that, however, Comparative Examples 5 through 18 are conducted for purposes of comparison of the (acrylic acid/acrylate–maleic acid/maleate) copolymer of Embodiment 2, and not for purposes of comparison of the (meth)acrylic acid polymer of Embodiment 1.

For example, the polyacrylic polymer of the completely neutralized type obtained in Comparative Example 5 is introduced with a sulfonic acid group at an end terminal, and has a weight average molecular weight Mw of 9,000 or smaller and an anti-gelling ability Q-value of 2.0 or smaller. Thus, it has not only excellent dispersing ability and chleating ability, but also high resistance to gelling. Hence, the polyacrylic polymer of the completely neutralized type obtained in Comparative Example 5 is a (meth)acrylic acid polymer of the present invention. In short, Comparative Example 5 is an example of Embodiment 1.

Also, copolymers obtained in Examples 8, 10, 11, and 12 are introduced with a sulfonic acid group at an end terminal, and have an anti-gelling ability Q-value of 2.0 or smaller, thereby having not only excellent dispersing ability and chleating ability, but also high resistance to gelling. Hence, the copolymers obtained in Examples 8, 10, 11, and 12 are (meth)acrylic acid polymers of the present invention. In short, Examples 8, 10, 11, and 12 are examples of Embodiment 1.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A (meth)acrylic acid polymer obtained by polymerizing, in an aqueous solution, monomers comprising 50–100 mol % of (meth)acrylic acid, and 0–50 mol % of a water-soluble monoethylenic unsaturated monomer copolymerizible with said (meth)acrylic acid when needed, the polymerization being initiated by both persulfate and bisulfite salts, the weight ratio of bisulfite salts to persulfate salts being in a range between 0.5:1 and 5:1, the total amount of added persulfate salts and bisulfite salts being in the range of 6 grams to 15 grams based on 1 mole of the monomers, said (meth)acrylic acid polymer having a sulfonic acid group at an end terminal, a weight average molecular weight between 3,000 and 15,000, a clay dispersing ability of 60% or greater in high hard water, a calcium ion trapping ability of 210 mg CaCO$_3$/g or greater, and an anti-gelling ability Q-value smaller than 2.0, where said anti-gelling ability Q-value is defined as:

$$Q = \frac{\text{degree of gelling} \times 10^5}{\text{weight average molecular weight}}.$$

2. The (meth)acrylic acid polymer of claim 1, wherein a solid concentration of an aqueous solution when a polymerization reaction ends is 40% or higher.

3. A manufacturing method of a (meth)acrylic acid polymer, wherein:

60 mol % or more of a hydrophilic monomer containing 50 mol % or more of (meth)acrylic acid is used;

a pH and a degree of neutralization when conducting a polymerization reaction of said monomer is smaller than 5 and smaller than 40 mol %, respectively; and a combination of at least one kind of persulfate salts and at least one kind of bisulfite salts is used as an initiator series, the weight ratio of persulfate salts to bisulfate salts being in range of between 0.5:1 and 5:1;

the total amount of added persulfate salts and bisulfite salts being in the range of 6 grams to 15 grams based on 1 mole of the monomer; and the (meth)acrylic acid polymer being manufactured to have a clay dispersing ability of 60% or greater in high hard water and a calcium ion trapping ability of 210 mg CaCO$_3$/g or greater.

4. The (meth)acrylic acid polymer of claim 1, wherein the weight ratio of persulfate to bisulfite is in a range between 1:1 and 4:1.

5. The (meth)acrylic acid polymer of claim 1, wherein the persulfate is selected from the group consisting of sodium persulfate, potassium persulfate and ammonium persulfate.

6. The (meth)acrylic acid polymer of claim 1, wherein the bisulfite is selected from the group consisting of sodium bisulfite, potassium bisulfite and ammonium bisulfite.

7. The method of manufacturing a (meth)acrylic acid polymer of claim 4, wherein the weight ratio of bisulfite salts to persulfate salts is in a range of between 1:1 and 4:1.

8. The method of manufacturing a (meth)acrylic acid polymer of claim 3, wherein the persulfate salts are selected from the group consisting of sodium persulfate, potassium persulfate and ammonium persulfate.

9. The method of manufacturing a (meth)acrylic acid polymer of claim 3, wherein the bisulfite salts are selected from the group consisting of sodium bisulfite, potassium bisulfite and ammonium bisulfite.

10. A method of manufacturing a (meth)acrylic acid polymer, comprising:
polymerizing, in an aqueous solution, monomers comprising 50–100 mol % of (meth)acrylic acid, and 0–50 mol % of a water-soluble monoethylenic unsaturated monomer copolymerizible with said (meth)acrylic acid;
initiating polymerization by both one or more persulfate salts and one or more bisulfite salts, the weight ratio of bisulfite salts to persulfate salts being in the range of 1:1 to 4:1, the persulfate salts and bisulfite salts being added together, the total amount of added persulfate salts and bisulfite salts being in the range of 6 grams to 15 grams based on 1 mole of the monomers; and
terminating polymerization with a sulfonic acid group to produce a polymer having an anti-gelling ability Q-value less than 2.0, where said anti-gelling ability Q-value is defined as:

$$Q = \frac{\text{degree of gelling} \times 10^5}{\text{weight average molecular weight}}$$

wherein the (meth)acrylic acid polymer is manufactured to have a clay dispersing ability of 60% or greater in high hard water and a calcium ion trapping ability of 210 mg $CaCO_3$/g or greater.

11. The (meth)acrylic acid polymer of claim 1, wherein the (meth)acrylic acid polymer has a clay dispersing ability in low hard water is 85% or greater.

12. The (meth)acrylic acid polymer of claim 1, wherein said water-soluble monoethylenic unsaturated monomer is at least one compound selected the group consisting of a monoethylenic unsaturated aliphatic dicarboxylic acid, a monoethylenic unsaturated monomer having sulfonic acid group, and partially or completely neutralized salts thereof.

13. The (meth)acrylic acid polymer of claim 1, wherein the (meth)acrylic acid polymer is obtained at a polymerization reaction temperature of 80° C. or higher by individually and simultaneously dropping sodium bisulfite and sodium persulfate into a liquid.

14. The manufacturing method of a (meth)acrylic acid polymer of claim 3, wherein the (meth)acrylic acid polymer has a clay dispersing ability in low hard water is 85% or greater.

15. The manufacturing method of a (meth)acrylic acid polymer of claim 3, wherein said water-soluble monoethylenic unsaturated monomer is at least one compound selected from the group consisting of a monoethylenic unsaturated aliphatic dicarboxylic acid, a monoethylenic unsaturated monomer having a sulfonic acid group, and partially or completely neutralized salts thereof.

16. The manufacturing method of a (meth)acrylic acid polymer of claim 3, wherein the (meth)acrylic acid polymer is obtained at a polymerization reaction temperature of 80° C. or higher by individually and simultaneously dropping sodium bisulfite and sodium persulfate into a liquid.

* * * * *

UNITED STATES PATENT AND TRADEMARK OFFICE
CERTIFICATE OF CORRECTION

| | |
|---|---|
| PATENT NO. : 6,310,156 B1 | |
| DATED : October 30, 2001 | |
| INVENTOR(S) : Yoshihiro Maeda et al. | |

It is certified that error appears in the above-identified patent and that said Letters Patent is hereby corrected as shown below:

Title page,
Item [56], change "(DE)" to -- (FR) --

Column 1,
Line 22, insert -- @ -- after "and".
Line 23, delete "(" before "Japanese".

Column 3,
Line 34, change "Patent" to -- patent --.

Column 8,
Line 35, change "1g" to -- 15g --.

Column 15,
Line 56, "etc." ends the paragraph; and change "it" to -- It --.

Column 21,
Line 59, change "-" to -- . --.

Column 22,
Line 19, change "-" to -- . --.
Line 44, change "-" to -- . --.

Column 27,
Line 33, "ability." ends the paragraphs; and change "on" to -- On --.

Column 30,
Line 25, change "minuets" to -- minutes --.
Line 50, change "minuets" to -- minutes --.
Line 38, change "ref lux" to -- reflux --.

Columns 31 and 32,
Please replace TABLE 3 with the attached new TABLE 3.

Columns 33 and 34,
Please replace TABLE 5 with the attached new TABLE 5.

UNITED STATES PATENT AND TRADEMARK OFFICE
CERTIFICATE OF CORRECTION

PATENT NO.    : 6,310,156 B1
DATED         : October 30, 2001
INVENTOR(S)   : Yoshihiro Maeda et al.

It is certified that error appears in the above-identified patent and that said Letters Patent is hereby corrected as shown below:

Column 34,
Please insert the attached TABLE 7 after TABLE 6.

TABLE 3

| EXAMPLE | | 7 | 8 | 9 | 10 | 11 | 12 | 13 | 14 |
|---|---|---|---|---|---|---|---|---|---|
| ORIGINAL CHARGE | ION EXCHANGE WATER (g) | 150 | 150 | 170 | 427 | 150 | 640 | 736.7 | 736.7 |
| | MALEIC ANHYDRIDE (g) | 98 | 98 | 98 | 98 | 147 | 147 | 196 | 196 |
| | (mole) | 1 | 1 | 1 | 1 | 1.5 | 1.5 | 2 | 2 |
| | 48% NaOH aq (g) | 83.3 | 41.7 | 20.8 | 41.7 | 62.5 | 62.5 | 83.3 | 83.3 |
| | (mole) | 1 | 0.5 | 0.25 | 0.5 | 0.75 | 0.75 | 1 | 1 |
| INITIAL DEGREE OF NEUTRALIZATION (%) | | 50 | 25 | 12.5 | 25 | 25 | 25 | 25 | 25 |
| DROPPING | 80% AA aq (g) | 810 | 810 | 810 | 810 | 765 | 765 | 720 | 720 |
| | (mole) | 9 | 9 | 9 | 9 | 8.5 | 8.5 | 8 | 8 |
| | 15% NaPS aq (g) | 266.7 | 266.7 | 266.7 | 266.7 | 400.0 | 266.7 | 266.7 | 400.0 |
| | (g/mole) | 4 | 4 | 4 | 4 | 6 | 4 | 4 | 6 |
| | 35% SBS aq (g) | 228.6 | 228.6 | 228.6 | 228.6 | 228.6 | 228.6 | 228.6 | 228.6 |
| | (g/mole) | 8 | 8 | 8 | 8 | 8 | 8 | 8 | 8 |
| | ION EXCHANGE WATER (g) | 46.8 | 46.8 | 46.8 | 89.0 | 102.9 | 0.0 | 0.0 | 0.0 |
| DROPPING TIME | 80% AA aq (min.) | 0~180 | 0~180 | 0~180 | 0~180 | 0~180 | 0~180 | 0~180 | 0~180 |
| | 15% NaPS aq (min.) | 0~190 | 0~190 | 0~190 | 0~190 | 0~190 | 0~190 | 0~190 | 0~190 |
| | 35% SBS aq (min.) | 0~190 | 0~190 | 0~190 | 0~190 | 0~190 | 0~190 | 0~190 | 0~190 |
| | ION EXCHANGE WATER (min.) | 0~190 | 0~190 | 0~190 | 0~190 | 0~190 | | | |
| POST-NEUTRALIZATION | 48% NaOH aq (g) | 750.0 | 791.7 | 812.5 | 300.0 | 791.7 | 300.0 | 316.7 | 316.7 |
| | (mole) | 9 | 9.5 | 9.75 | 3.6 | 9.5 | 3.6 | 3.8 | 3.8 |
| FINAL DEGREE OF NEUTRALIZATION (%) | | 91 | 91 | 91 | 37.3 | 89 | 38 | 40 | 40 |

48% NaOH aq: 48% AQUEOUS SOLUTION OF SODIUM HYDROXIDE
80% AA aq: 80% AQUEOUS SOLUTION OF ACRYLIC ACID
15% NaPS aq: 15% AQUEOUS SOLUTION OF SODIUM PERSULFATE
35% SBS aq: 35% AQUEOUS SOLUTION OF SODIUM BISULFITE

UNITED STATES PATENT AND TRADEMARK OFFICE
CERTIFICATE OF CORRECTION

PATENT NO. : 6,310,156 B1
DATED : October 30, 2001
INVENTOR(S) : Yoshihiro Maeda et al.

It is certified that error appears in the above-identified patent and that said Letters Patent is hereby corrected as shown below:

Table 5

| COMPARATIVE EXAMPLE | | 6 | 7 | 8 | 9 | 10 |
|---|---|---|---|---|---|---|
| ORIGINAL CHARGE | ION EXCHANGER WATER (g) | 700 | 375.3 | 750.7 | 1112 | 806 |
| | MALEIC ANHYDRIDE (g) (mole) | | 98 1 | 196 2 | 294 3 | 294 3 |
| | 48% NaOH aq (g) (mole) | | 166.7 2 | 333.3 4 | 250 3 | 500 6 |
| INITIAL DEGREE OF NEUTRALIZATION (%) | | | 100 | 100 | 50 | 100 |
| DROPPING | 80% AA aq (g) (mole) | | 810 8 | 720 8 | 630 7 | 630 7 |
| | 37% SA aq (g) (mole) | | | | | |
| | 15% NaPS aq (g) | 2032 | 289.7 4 | 428.6 16 | 400 6 | 228.6 8 |
| | 35% H₂O₂ aq (g) | 106.7 2 | | 131.4 | | |
| | ION EXCHANGER WATER (g/min) | 1000 | 1100 | | 44 | |
| DROPPING TIME | 80% AA aq (min.) | 0-240 | 0-180 | 0-180 | 0-180 | 0-180 |
| | 37% SA aq (min.) | 0-240 | 0-190 | 0-180 | 0-190 | 0-190 |
| | 15% NaPS aq (min.) | 0-240 | 0-190 | 0-180 | 0-190 | 0-190 |
| | 35% H₂O₂ aq (min.) | | | | | |
| | ION EXCHANGER WATER (min.) | | | | | |
| POST-NEUTRALIZATION 48% NaOH aq (g) | | | 658.3 7.9 | | 725 8.7 | 475 5.7 |
| FINAL DEGREE OF NEUTRALIZATION (%) | | 100 | 90 | 33.3 | 90 | 90 |

48% NaOH aq: 48% AQUEOUS SOLUTION OF SODIUM HYDROXIDE
80% AA aq: 80% AQUEOUS SOLUTION OF ACRYLIC ACID
37% SA aq: 37% AQUEOUS SOLUTION OF SODIUM ACRYLATE
15% NaPS aq: 15% AQUEOUS SOLUTION OF SODIUM PERSULFATE
35% H₂O₂ aq: 35% AQUEOUS SOLUTION OF HYDROGEN PEROXIDE

TABLE 6

| | | SOLID (%) | INITIATOR SERIES | AA/MA MOLE RATIO | WEIGHT AVERAGE MOLECULAR WEIGHT (Mw) | MA×Mw | ANTI-GELLING ABILITY (g) | Ca TRAPPING ABILITY (mgCaCO₃/g) | CLAY DISPERSING ABILITY (TURBIDITY %) | |
|---|---|---|---|---|---|---|---|---|---|---|
| | | | | | | | | | HIGH HARD WATER | LOW HARD WATER |
| EXAMPLE | 7 | 48 | NaPS/SBS | 90/10 | 13000 | 130,000 | 2.54 | 280 | 57 | 86 |
| | 8 | 47 | NaPS/SBS | 90/10 | 10000 | 100,000 | 1.86 | 275 | 61 | 88 |
| | 9 | 46 | NaPS/SBS | 90/10 | 15000 | 150,000 | 2.82 | 280 | 53 | 81 |
| | 10 | 43 | NaPS/SBS | 90/10 | 7000 | 70,000 | 1.84 | 270 | 64 | 89 |
| | 11 | 42 | NaPS/SBS | 85/15 | 10000 | 150,000 | 1.92 | 290 | 52 | 80 |
| | 12 | 42 | NaPS/SBS | 85/15 | 7000 | 105,000 | 1.75 | 275 | 58 | 88 |
| | 13 | 41 | NaPS/SBS | 80/20 | 7000 | 140,000 | 2.68 | 280 | 52 | 87 |
| | 14 | 40 | NaPS/SBS | 80/20 | 5000 | 100,000 | 2.31 | 275 | 58 | 89 |
| | 15 | 42 | H₂O₂/MOHR'S SALT | 90/10 | 5000 | 50,000 | 1.73 | 270 | 67 | 92 |
| | 16 | 41 | H₂O₂/MOHR'S SALT | 90/10 | 14000 | 140,000 | — | 285 | 51 | 78 |
| | 17 | 42 | H₂O₂/MOHR'S SALT | 90/10 | 10000 | 100,000 | — | 280 | 53 | 82 |
| | 18 | 41 | H₂O₂/MOHR'S SALT | 90/10 | 11000 | 110,000 | — | 280 | 53 | 81 |
| | 19 | 41 | H₂O₂/MOHR'S SALT | 85/15 | 10000 | 150,000 | — | 300 | 52 | 84 |
| | 20 | 43 | H₂O₂/MOHR'S SALT | 85/15 | 5000 | 75,000 | — | 280 | 59 | 86 |
| | 21 | 43 | H₂O₂/MOHR'S SALT | 85/15 | 7000 | 105,000 | — | 285 | 58 | 85 |
| | 22 | 42 | H₂O₂/MOHR'S SALT | 80/20 | 5000 | 100,000 | — | 275 | 55 | 88 |

AA: ACRYLIC ACID   MA: MALEIC ANHYDRIDE   NaPS: SODIUM PERSULFATE   SBS: SODIUM BISULFITE
H₂O₂: HYDROGEN PEROXIDE   MOHR'S SALT: IRON (II) AMMONIUM SULFATE HEXAHYDRATE

UNITED STATES PATENT AND TRADEMARK OFFICE
CERTIFICATE OF CORRECTION

PATENT NO. : 6,310,156 B1
DATED : October 30, 2001
INVENTOR(S) : Yoshihiro Maeda et al.

It is certified that error appears in the above-identified patent and that said Letters Patent is hereby corrected as shown below:

TABLE 7

| | | SOLID (%) | INITIATOR SERIES | AA/MA (MOLE RATIO) | WEIGHT AVERAGE MOLECULAR WEIGHT (Mw) | MA×Mw | ANTI-GELLING ABILITY (Q) | Ca TRAPPING ABILITY (mgCaCO$_3$/g) | CLAY DISPERSING ABILITY (TURBIDITY X) | |
|---|---|---|---|---|---|---|---|---|---|---|
| | | | | | | | | | HIGH HARD WATER | LOW HARD WATER |
| COMPARATIVE EXAMPLE | 5 | 25 | AIR/SBS | 100/0 | 4000 | 0 | 1.95 | 230 | 63 | 91 |
| | 6 | 20 | NaPS | 100/0 | 5000 | 0 | 3.92 | 240 | 60 | 91 |
| | 7 | 30 | NaPS | 90/10 | 30000 | 300,000 | — | 285 | 41 | 82 |
| | 8 | 35 | H$_2$O$_2$ | 80/20 | 10000 | 200,000 | — | 285 | 45 | 86 |
| | 9 | 35 | NaPS | 70/30 | 10000 | 300,000 | — | 300 | 32 | 83 |
| | 10 | 40 | H$_2$O$_2$ | 70/30 | 15000 | 450,000 | — | 320 | 25 | 77 |
| | 11 | 45 | H$_2$O$_2$ | 70/30 | 3000 | 90,000 | — | 360 | 47 | 89 |
| | 12 | 45 | H$_2$O$_2$/NaPS | 70/30 | 3000 | 90,000 | — | 380 | 46 | 88 |
| | 13 | 45 | H$_2$O$_2$ | 50/50 | 4000 | 200,000 | — | 320 | 23 | 87 |
| | 14 | 45 | H$_2$O$_2$/NaPS | 60/40 | 4000 | 160,000 | — | 340 | 31 | 85 |
| | 15 | 45 | H$_2$O$_2$/NaPS | 50/50 | 5000 | 250,000 | — | 360 | 21 | 84 |
| | 16 | 45 | H$_2$O$_2$ | 60/40 | 4000 | 160,000 | — | 340 | 42 | 82 |
| | 17 | 45 | H$_2$O$_2$/NaPS | 50/50 | 12000 | 600,000 | — | 410 | 19 | 78 |
| | 18 | 45 | H$_2$O$_2$/NaPS | 60/40 | 8000 | 320,000 | — | 400 | 27 | 77 |

AA: ACRYLIC ACID   MA: MALEIC ANHYDRIDE   NaPS: SODIUM PERSULFATE   SBS: SODIUM BISULFITE
H$_2$O$_2$: HYDROGEN PEROXIDE

Signed and Sealed this

Twenty-third Day of April, 2002

Attest:

*Attesting Officer*

JAMES E. ROGAN
*Director of the United States Patent and Trademark Office*